US012129619B2

(12) United States Patent
Magali

(10) Patent No.: US 12,129,619 B2
(45) Date of Patent: Oct. 29, 2024

(54) CLEFT-MALLET

(71) Applicant: Shachar Magali, Drimmelen (NL)

(72) Inventor: Shachar Magali, Drimmelen (NL)

( * ) Notice: Subject to any disclaimer, the term of this patent is extended or adjusted under 35 U.S.C. 154(b) by 168 days.

(21) Appl. No.: 16/756,078

(22) PCT Filed: Oct. 15, 2018

(86) PCT No.: PCT/NL2018/000017
§ 371 (c)(1),
(2) Date: Apr. 14, 2020

(87) PCT Pub. No.: WO2019/078706
PCT Pub. Date: Apr. 25, 2019

(65) Prior Publication Data

US 2020/0256028 A1 Aug. 13, 2020

(30) Foreign Application Priority Data

Oct. 16, 2017 (NL) ..................................... 1042591

(51) Int. Cl.

| | |
|---|---|
| ***E02D 3/054*** | (2006.01) |
| ***E02D 3/02*** | (2006.01) |
| ***E02D 3/08*** | (2006.01) |
| *B25D 1/02* | (2006.01) |
| *E01C 23/12* | (2006.01) |

(52) U.S. Cl.
CPC ............... *E02D 3/054* (2013.01); *E02D 3/08* (2013.01); *B25D 1/02* (2013.01); *B25D 2222/42* (2013.01); *B25D 2250/025* (2013.01); *E01C 23/124* (2013.01)

(58) Field of Classification Search
CPC ........... E01C 23/124; B25D 2250/025; B25D 2222/42; B25D 1/02; E02D 3/054; E02D 3/08
See application file for complete search history.

(56) References Cited

U.S. PATENT DOCUMENTS

| | | | |
|---|---|---|---|
| 2,659,583 | A | 11/1953 | Dorkins |
| 3,568,657 | A | 3/1971 | Gue |

(Continued)

FOREIGN PATENT DOCUMENTS

| | | | |
|---|---|---|---|
| JP | H08296252 | A | 11/1996 |
| JP | H09151476 | A | 6/1997 |

(Continued)

OTHER PUBLICATIONS

International Search Report and Written Opinion issued in application No. PCT/NL2018/000017 mailed Jan. 25, 2019.

(Continued)

*Primary Examiner* — Frederick L Lagman
*Assistant Examiner* — Stacy N Lawson
(74) *Attorney, Agent, or Firm* — Troutman Pepper Hamilton Sanders LLP; Ryan A. Schneider

(57) ABSTRACT

A mallet is described that has at least one cleft, in such a structure that the stress wave created during impact has longer travel way than the length of the mallet as measured along the impact line. This mallet induces longer-lasting and weaker stress wave(s) in the anvil as compared to a solid mallet having the same outer dimensions and more or less the same weight. The Cleft-Mallet increases the effectiveness of the strike, while decreasing the stresses in the anvil.

20 Claims, 22 Drawing Sheets

(56) References Cited

U.S. PATENT DOCUMENTS

| | | | | |
|---|---|---|---|---|
| 3,938,595 | A | 2/1976 | Swenson | |
| 4,025,029 | A | 5/1977 | Kotas et al. | |
| 4,039,012 | A | 8/1977 | Cook | |
| 4,497,376 | A | 2/1985 | Kurylko | |
| 4,831,901 | A | 5/1989 | Kinne | |
| 5,004,241 | A | 4/1991 | Antonious | |
| 5,285,974 | A | 2/1994 | Cesarini | |
| 5,313,825 | A | 5/1994 | Webster et al. | |
| 5,490,740 | A | 2/1996 | Johnson | |
| 5,607,022 | A | 3/1997 | Walker et al. | |
| 5,662,094 | A | 9/1997 | Giacomelli | |
| 6,000,477 | A * | 12/1999 | Campling | E02D 7/10 173/100 |
| 6,557,647 | B2 | 5/2003 | White | |
| 6,763,747 | B1 | 7/2004 | Gierer et al. | |
| 6,827,333 | B1 | 12/2004 | Lutz | |
| 8,763,719 | B2 | 7/2014 | White | |
| 2009/0308627 | A1 * | 12/2009 | Andersson | B25D 17/245 173/128 |
| 2014/0270985 | A1 | 9/2014 | Maher et al. | |
| 2014/0352498 | A1 * | 12/2014 | Liao | B25D 1/14 81/26 |
| 2016/0215573 | A1 * | 7/2016 | Jansson | E21B 1/02 |

FOREIGN PATENT DOCUMENTS

| | | | | |
|---|---|---|---|---|
| JP | 2007231562 | A | 9/2007 | |
| WO | WO-2008027149 | A2 * | 3/2008 | B25F 1/006 |

OTHER PUBLICATIONS

NL Search Report and Written Opinion issued in application No. NL 1042591 mailed Jun. 7, 2018.

* cited by examiner

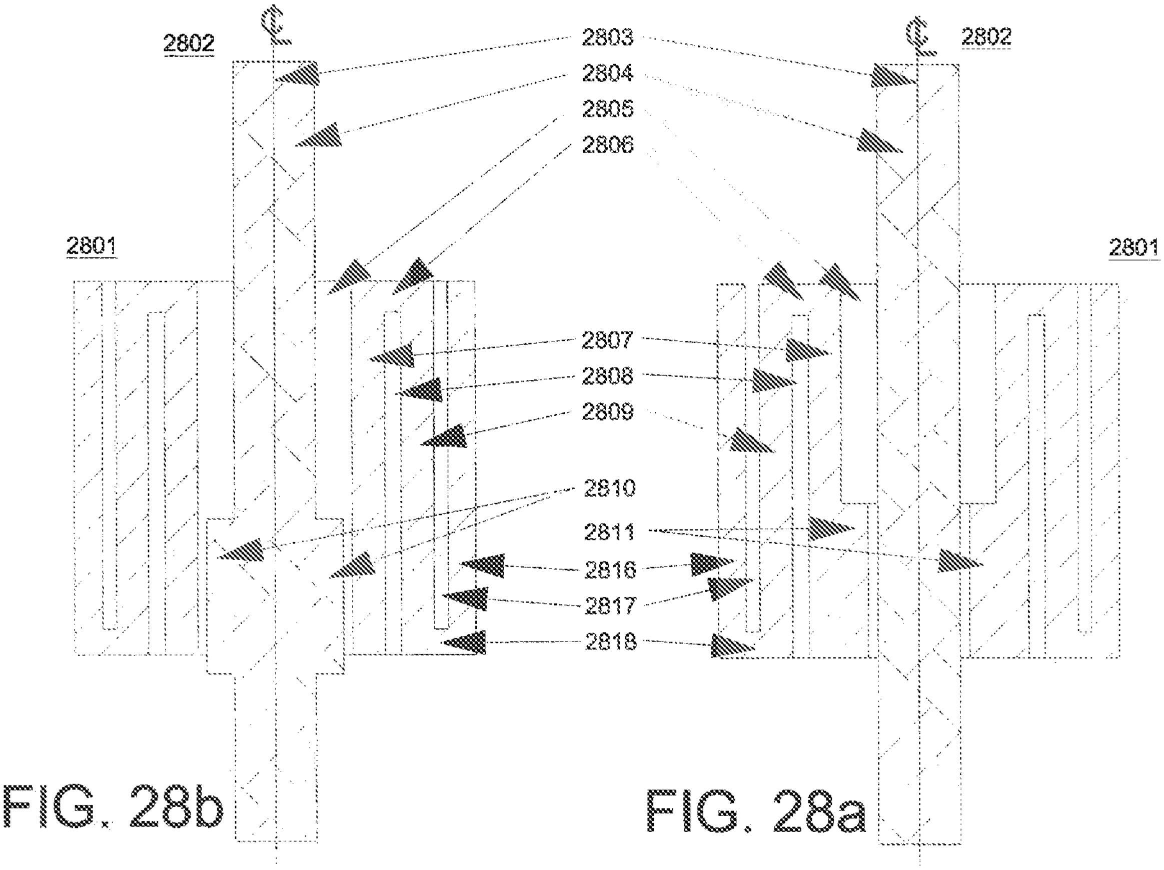
FIG. 28b
FIG. 28a
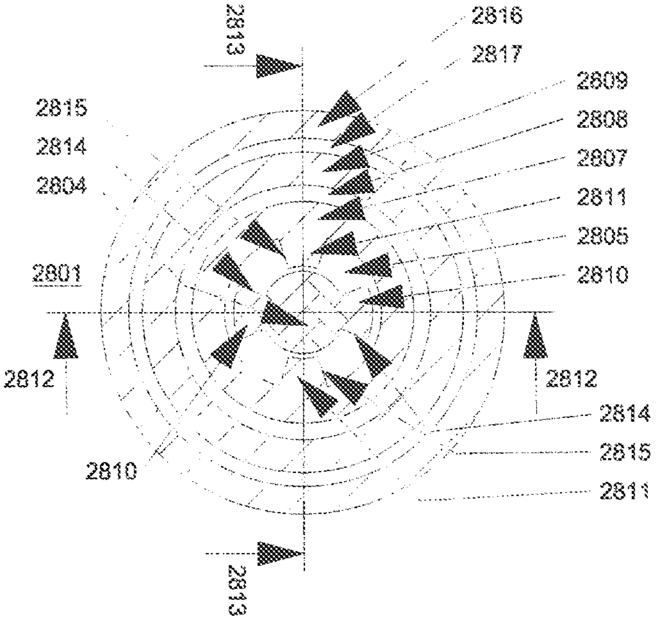
FIG. 28

CLEFT-MALLET

FIELD OF THE INVENTION

The present invention relates in general to a Cleft-Mallet. The improved mallet proposed by the present invention is for instance, but not exclusively, useful in the fields of hand held took, metal industry, forging, punching, pile driving, pile extracting, pile drilling, ground displacement, timber, demolition, ground compacting, rock braking, rock drilling, machine building, and machine maintenance.

INTRODUCTORY REMARKS AND DEFINITIONS

In order to assist in reading and understanding the present invention, the following remarks and definitions are made:

1. For this patent application, the mass being used to drive a body, to rotate a body, to drive a body into another body, to deform a body, to break a body, or to compact material(s) is called “mallet”. The words “hammer”, “ram”, “maul”, “block”, “weight”, or “compactor” or any combination of them, are, for the sake of this patent application, synonyms to “mallet”.
2. This patent application distinguishes between two kinds of mallets, namely, ruled (or longitudinal) mallets, and rotary mallets. Ruled mallets have linear movement while striking, causing linear/shear stresses combination in their structure. Rotary mallets have rotary movement while striking, causing torsion/shear stresses combination in their structure.
3. For this patent application, the word “mallet segment”, sometimes abbreviated as “segment”, means a part, or a section, or a slice, of the mallet. Adjust segments are connected to each other such that stress waves can pass from one segment to the next. With a view to stress waves, segments will define a segment propagation path having at least one entrance and at least one exit, except for a first segment and a last segment. The first segment has impact face which strikes the anvil, and exit. The last segment has an entrance. The exit of one segment is coupled to the entrance of an adjacent segment, thus effectively coupling the two segment propagation paths sequentially. Due to the one or more clefts, stress waves can essentially only enter a segment through the entrance or one of the entrances thereof, and can only leave a segment through the exit or one of the exits. Together, the segment propagation paths define a mallet propagation path. In the transition from one segment to the next, the direction of the stress wave changes, and the stress type of the stress wave changes as well. Consequently, two adjacent segments have different types of stresses during impact. In between two segments, there is, at least, one cleft.
4. A gap, or separation, in between two, or more, segments of a mallet will, in this patent application, be indicated by the word “cleft”. The cleft enables relative, strain related, movement(s) between segments of the mallet. Cleft may have zero width in some place(s) which means that it is possible to have contact(s) in between segments—as long as the cleft allows relative, strain related, movement(s) in between those segments. The relative movement(s) is due to different strains inside the relevant segments, which deform the materials of the said segments. The cleft forces the stress wave(s), created during impact, to change direction, and to change type, while propagating through the Cleft-Mallet, along longer path than the strike line length, inside the Cleft-Mallet. The cleft changes the type of the stress wave, for instance, from linear stress to shear stress, or from tension stress to compression stress, or from positive-shear stress to negative-shear stress, or from no-shear stress to shear stress, or from no-linear stress to linear stress, or from shear stress to torsion stress, or from positive-torsion stress to negative-torsion stress, or from no-torsion stress to torsion stress, or vice versa. The cleft prevents stress waves from propagating from one segment to another segment not through the entrance-exit mechanism of the relevant segments.
5. For this patent application, the body onto which the mallet strikes, is indicated by the word “anvil”. The anvil may be, for example, but not exclusive, nail, rivet, pile, sheet pile, concrete, asphalt, aggregate, gravel, earth, ground, send, day, back-filled material, rock, pin, bushing, rod, tube, chisel, forging material, processed material, block, punch, axis, shaft, pivot, hinge, spindle, mandrill, pole, or piston.
6. The phrases “positive-shear stress” or “positive-torsion stress”, and “negative-shear stress” or “negative-torsion stress”, as used here mean shear stress or torsion stress, respectively, to mutually opposite directions. The term “negative-shear stress” or “negative-torsion stress” means shear stress or torsion stress to the opposite direction of the “positive-shear stress” or “positive-torsion stress”, respectively. It is in principle not relevant which direction is indicated as positive and which direction is indicated as negative. The phrases “no-shear stress”, “no-torsion stress” and “no-linear stress”, as used here mean a stress condition without a shear component or without a torsion component or without a linear component, respectively.
7. For this patent application, the boundaries between adjust segments having linear stress and shear stress, or between segments having positive-shear stress and negative-shear stress, or between segments having compression stress and tension stress, or between segments having no-linear stress and linear-stress, or between segments having no-shear stress and shear-stress, or between segments having no-torsion stress and torsion stress, or between segments having positive-torsion stress and negative-torsion stress, or between segments having torsion stress and shear stress—are neither defined, nor marked. The stress type, in a segment, which is different than the stress type in its adjacent segment(s), during impact, states. As an example, if one segment has combination of tension stress and negative-shear stress, and the adjust segment has combination of compression tress and negative-shear stress, then the difference between tension stress and compression stress states,
8. In a material, one or more stress conditions may exist. The present invention distinguishes between the following types of stress:

Compression stress or compressive stress  
Tension stress or tensile stress  
Linear stress (means compression stress, or tension stress)  
No-linear stress  
Positive-shear stress  
Negative-shear stress  
Shear stress (means positive-shear stress, or negative-shear stress)  
No-shear stress Positive-torsion stress
Negative-torsion stress
Torsion stress (means positive-torsion stress, or negative-torsion stress)
No-torsion stress 9. Stress waves have different travelling velocities inside different materials. Even in the same material, as an example, linear stress waves and shear stress waves have different travelling velocities. The effects of the difference in velocities is beyond the needed details, and information, in order to clearly describe this invention.
10. Stress waves create echo waves, reflecting waves, and back-propagating waves. The effect, and influence, of the echo waves, the reflecting waves, and the back-propagating waves—are beyond the needed details, and information, in order to clearly describe this invention.
11. In order to be clear, the term "first segment" means the segment of a mallet, which one of its surfaces comes into contact with the anvil during impact. This segment has an exit, but does not have an entrance. The term "last segment" means the segment which has an entrance, but has no exit. The segments of the mallet will be called "first segment", "second segment", "third segment" etc. . . . "last segment", in the order the stress wave propagating through them.
12. For this patent application the "stress wave" is the wave created by striking mallet on anvil, and propagating from the surface of the first segment coming in contact with the anvil, and along the first segment, all the way to the point of the last segment furthest away from the entrance of the last segment.
13. For this patent application, the term "strike line length" means, for ruled mallets, the length of the mallet as being measured from the surface of the mallet striking on the anvil, along the movement vector of the mallet, to the most far away point of the mallet. For rotary mallets, the term "strike line length" means the longer between the length of the rotary mallet as measured parallel to the rotation center line, and the thickness of the material of the rotary mallet as measured perpendicular to the rotation center line. The strike wave duration of a mallet having neither segments, nor clefts, is proportional to the strike line length.
14. For this patent application, the term "mallet progressive path" means the actual length of the stress wave propagating inside the mallet.
15. After a strike of a mallet on an anvil, one stress wave starts propagating along, and/or around, the mallet, and, in parallel, one more stress wave starts propagating along, and/or around, the anvil. The two waves have the same starting time, and the same duration time. In the case of ruled mallet, the two waves propagate the opposite direction each other. In case of rotary mallet, while propagating, the two waves have opposite torsion, and/or shear, stress wave type (like negative-shear stress wave and positive-shear stress wave, or negative-torsion stress wave and positive-torsion stress wave). Sometimes the description relates to the stress wave propagating the anvil, and sometimes the stress wave propagating the mallet—but they, both, have the same time duration.
16. A mallet specially structured according to the present invention, i.e. including segments and at least one clefts as defined above, is indicated here by the phrase "Cleft-Mallet".

BACKGROUND OF THE INVENTION

The following illustrate examples of applications for hammers of various types:

| US patents documents | | | |
|---|---|---|---|
| 6,000,477 | Dec. 14, 1999 | Campling et al. | Elastomer accelerated hammer |
| 5,313,825 | May 24, 1994 | Webster et al. | Con penetrator |
| 5,607,022 | Mar. 4, 1997 | Walker et al. | Concrete breaker |
| 4,497,376 | 2/5/19856 | Kurylko | Diesel hammer |
| 4,831,901 | May 23, 1989 | Kinne | Double acting hammer |
| 2,659,583 | Nov. 17, 1953 | E. E. Dorkins | Drop hammer |
| 6,827,333 B1 | Dec. 7, 2004 | Lutz | Extended support hammer |
| 5,004,241 | Apr. 2, 1991 | Antonious | Golf club |
| 5,490,740 | Feb. 13, 1996 | Johnson | Ground compactor |
| 5,662,094 | Sep. 2, 1997 | Glacomelli | Guillotine cutter |
| 6,557,647 | May 6, 2003 | White | Impact hammer |
| 3,938,595 | Feb. 17, 1976 | Swenson | Franki hammer |
| 4,025,029 | May 24, 1977 | Kotas et al. | Nail driver |
| 4,039,012 | Aug. 2, 1977 | Cook | No rebound hammer |
| 3,568,657 | May 9, 1971 | Leonard L. Gue | Rock breaker |
| 6,763,747 B1 | Jul. 20, 2004 | Gierer et al. | Shook absorber hammer |
| 5,285,974 | Feb. 15, 1994 | Cesarini | Milling hammer |
| 8,763,719 | Jul. 1, 2014 | White | Compressed air pre-load |

Most of the prior art ruled, and rotary, mallets are built up from a solid body, in such a case, the length of the stress wave, created during impact, equals the strike line length.

There are prior art ruled mallets which are bunt up from two or more segments placed one on top of the other, considered with respect to the impact line. The stress wave length created by those segments equals the total length of the segments, as measured in parallel to the impact line, so the said prior art mallets are not a Cleft-Mallet.

There are prior art ruled mallets which are built up from two or more segments, connected to each other in parallel to the impact line. The segments are pre-stressed to each other, so parallel to the impact line there is no relative movement between them. Effectively, there is no deft in between the segments, so the said prior art mallets are not a Cleft-Mallet.

SUMMARY OF THE INVENTION

The challenge of the present invention is to provide a mallet having longer stress wave than the actual length of it, keeping more or less the same weight. Longer stress wave means longer stress wave duration time. Longer stress time duration means, in case of long anvil, that longer portion of the anvil is loaded daring the impact. In any case, the anvil is subjected to longer, and weaker stress wave which it can more easily withstand.

In pile driving, as an example, the length of the mallet is, significantly, shorter than the length of the driven pile. It means that, while impacting, just a portion of the pile is stressed. The stress wave is built up at the top of the pile, and then propagates downward. At each moment in time during the impact process, just part of the pile is being loaded. It would be more efficient if all the pile length would be loaded during the impact. If the length of the stress wave is equal, or longer, than the length of the pile, then, at a certain time, the pile is loaded to all its length, like by static force, but with the magnitude of dynamic force.

Thanks to the Cleft-Mallet proposed by the present invention, it is possible to construct mallets that create longer stress wave, while striking, than their actual length.

BRIEF DESCRIPTION OF THE DRAWINGS

These and other aspects, features and advantages of the present invention will be further explained by the following description of one or more exemplary embodiments with reference to the drawings, in which same reference numerals indicate same or similar parts, in which indications "below/above", "higher/lower", "left/right", "inner/outer", "top/bottom" etc. only relate to the orientation displayed in the drawings, and in which:

FIG. 28 shows a rotary Cleft-Mallet having two clefts and three segments. The lower part of the inner segment strikes the anvil.

FIG. 28*a* and FIG. 28*b* are cross sections through the rotary Cleft-Mallet of FIG. 28.

DETAILED DESCRIPTION OF THE INVENTION

Figure 1:
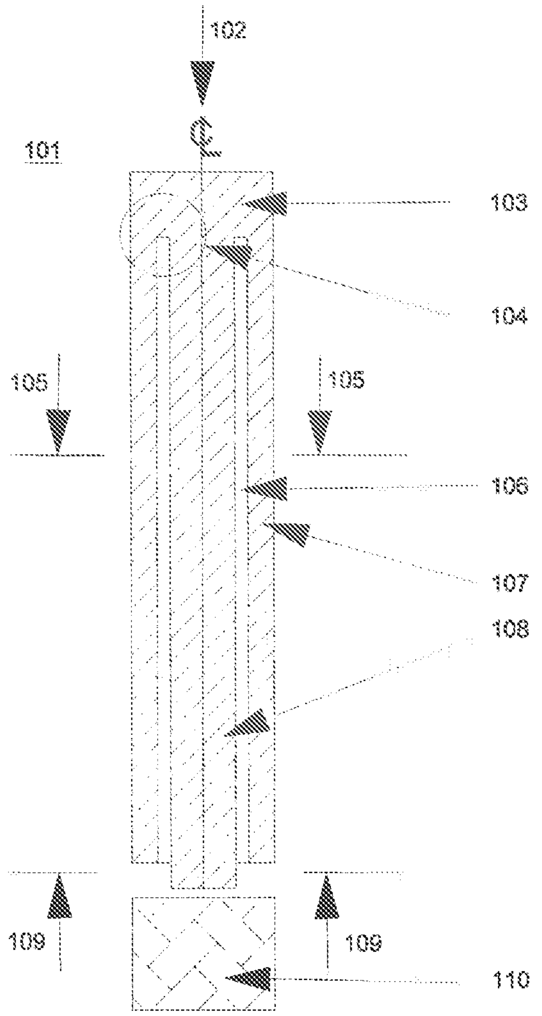
FIG. 1 shows a cross section through a single-cleft ruled Cleft-Mallet.

FIG. 1 schematically shows a first example of a rued Cleft-Mallet, generally indicated by reference numeral 101. The Cleft-Mallet in this example is rotation-symmetric with respect to a centre line CL. The view in FIG. 1 is a cross section along the centre line CL.

Figure 1A:
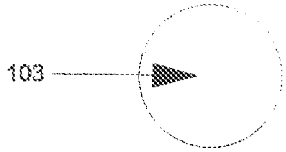
FIG. 1*a* is a top view of the Cleft-Mallet of FIG. 1.

FIG. 1*a* is a top view of the Cleft-Mallet 101, taken along the centre line CL, as indicated by arrow 102.

Figure 1B:
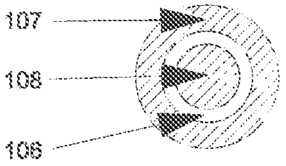
FIG. 1*b* and FIG. 1*c* are cross sections through the Cleft-Mallet of FIG. 1.

FIG. 1*b* is a cross section through the Cleft-Mallet 101, taken perpendicular to the centre line CL, as indicated by arrow 105.

Figure 1C:
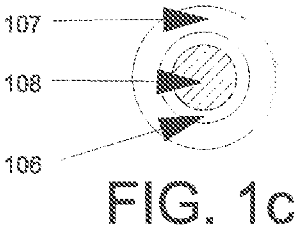

FIG. 1*c* is a cross section through the Cleft-Mallet 101, taken perpendicular to the centre line CL close to the lower end of the Cleft-Mallet 101, as indicated by arrow 109.

Figure 1D:
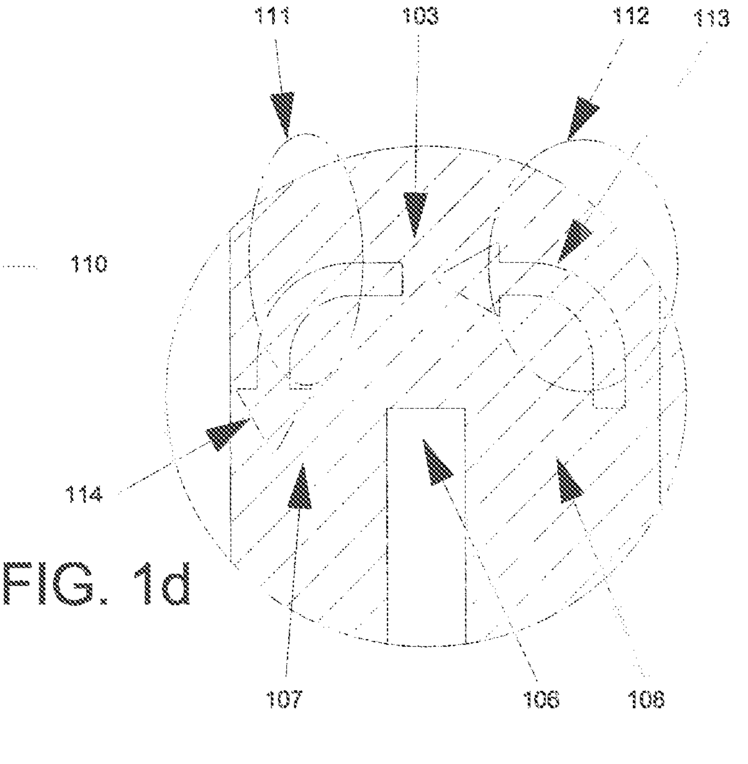
FIG. 1*d* is detailed view of the deft of the Cleft-Mallet of FIG. 1.

FIG. 1*d* is a detail 104 of FIG. 1.

In this embodiment, the Cleft-Mallet 101 can structurally be described as comprising a cylindrical inner body 108 arranged within a tubular outer body 107 with an annular gap 106 in between, which two bodies are attached to each other at their upper ends by a part 103 while for the remainder of their axial lengths they are free from each other. At the lower end, the inner body extends beyond the outer body, Below the mallet 101, an anvil 110 is shown. In use, when the mallet 101 strikes the anvil 110, it is exclusively the lower face of said inner body 108 that will contact the anvil 110; this lower face will therefore also be indicated as "contact face". The contact face of a Cleft-Mallet may have the same shape as prior art.

In normal use, the Cleft-Mallet will be given a speed more or less collinear with the centre line CL, more or less coincident with the center of gravity of the Cleft-Mallet, and crossing the contact face between the Cleft-Mallet and the anvil. The line of this speed will be indicated as the "impact line". In the embodiment shown in FIG. 1, the impact line coincides with the centre line CL, and the same applies to many of the embodiments discussed in the following.

In the functional context of the present invention, the inner body 108 is a longitudinal segment, the outer body 107 is a longitudinal segment, the part 103 is a radial segment, and the gap 106 is a deft in between these three segments. It is noted that in this embodiment the radial extent of the radial segment 103 is relatively short as compared to the longitudinal extent of the longitudinal segments 107, 108.

In the following, segments will be indicated "first", "second", "third" etc in the order in which a stress wave passes them.

When the Cleft-Mallet 101 strikes the anvil 110, a compression stress wave is generated in the first segment 108. This compression stress wave starts travelling in the first segment 108 from the contact face up in the direction of the second segment 103. It may be noted that the cleft 106 prevents the stress wave from making a transition into the third segment 107 directly from the first segment 108.

Via a first connection portion between the first segment 108 and the second segment 103, generally indicated at reference numeral 112, the stress wave makes a transition into the second segment 103, as generally indicated by a block arrow 113, and in this transition the compression stress wave transforms to a shear stress wave, which travels through the second segment 103 in the direction of the third segment 107. Via a second connection portion between the second segment 103 and the third segment 107, generally indicated at reference numeral 111, the stress wave makes a transition into the third segment 107, as generally indicated by a second block arrow 114, and in this transition the shear stress wave transforms to a tension stress wave. This tension stress wave propagates, inside third segment 107, in the direction of the free end of the third segment 107, which in the embodiment shown in the picture is close to the anvil 110.

If the deft 106 would not be existing in Cleft-Mallet 101—or, in other words, if the mallet 101 would have been made from one solid material, and the segments 103, 107, 108 would have been one integral solid part—then, during impact, just one compression stress wave would have created. This compression stress wave would travel from the contact face to the top of the solid mallet, at the top of what is marked in FIG. 1 as segment 103.

In contrast, in the Cleft-Mallet 101 the stress waves are forced to follow a propagation path that consists of a substantially longitudinal path in the first segment 108, a substantially radial path in the second segment 103, and a substantially longitudinal path in the third segment 107. The total duration time of the stress waves is the time needed for the compression stress wave to travel up along first segment 108, plus the time needed for the shear stress wave to cross segment 103, plus the time needed for the tension stress wave to travel down along third segment 107.

Compression stress waves and tension stress waves have the same travelling velocity, if segment 103 is, relativeiy, small compared to segments 107 and 108, as in the embodiment shown, and if the longitudinal sections 107 and 108 have substantially the same length, as in the embodiment shown, we may say that the time duration of the stress-waves in Cleft-Mallet 101, during impact, is about two times longer than the time duration of the stress-wave travelling through a solid mallet with the same dimensions as FIG. 1—but without cleft 106, i.e. when segments 103, 107, and 108 are one part. The intensity of the stress-wave created by the Cleft-Mallet 101 according to the present invention is less than the intensity created by such solid mallet.

Summarizing, a ruled Cleft-Mallet according to the present invention creates, after impact, a stress wave having longer time duration and weaker intensity than a solid mallet with the same external dimensions.

A strike of a mallet creates, in parallel, at least one stress wave in the mallet and at least one stress wave in the anvil. The wave(s) in the anvil travel the opposite direction of the wave(s) in the mallet—but both of them have the same travelling time duration. If the travelling time duration of the stress wave in the anvil, times the velocity of the stress wave in the anvil, is larger than or equal to the length of the anvil—then, there is a certain time in which the anvil is loaded to its entire length, like a static load, but with dynamic magnitude.

It has to be clear that deft 106 is, actually, a combination of two clefts. The first deft is between first segment 106 and second segment 103. The second deft is between second segment 103 and third segment 107. The two said clefts indicated together as deft 106 in order to make the drawing more clear, and intuitive.

In a variation of the Cleft-Mallet 101, the outer tube 107 is longer than the inner body 108, and the contact face is the lower face of the outer tube 107. The same description as above applies, except that the wave propagation direction has reversed, and that the outer tube 107 has the compression stress wave and the inner body 108 has the tension stress wave.

In either case, the stress wave in the first and third segments of this Cleft Mallet would predominantly be a linear stress wave, for which reason these segments may also be indicated as linear-stressed segments. The stress wave in the second segment 103 would predominantly be a shear wave, for which reason this second segment 103 may also be indicated as a shear stress segment. Nevertheless, the description here is slightly simplified, and in practice there may be shear stress wave components in the linear-stressed segments and/or linear stress wave components in the shear stress segment.

In the above, a rather elaborate description has been given of the transitions a stress wave makes in the material. In the following description of other embodiments, the explanation will be given in less detail.

Figure 2:
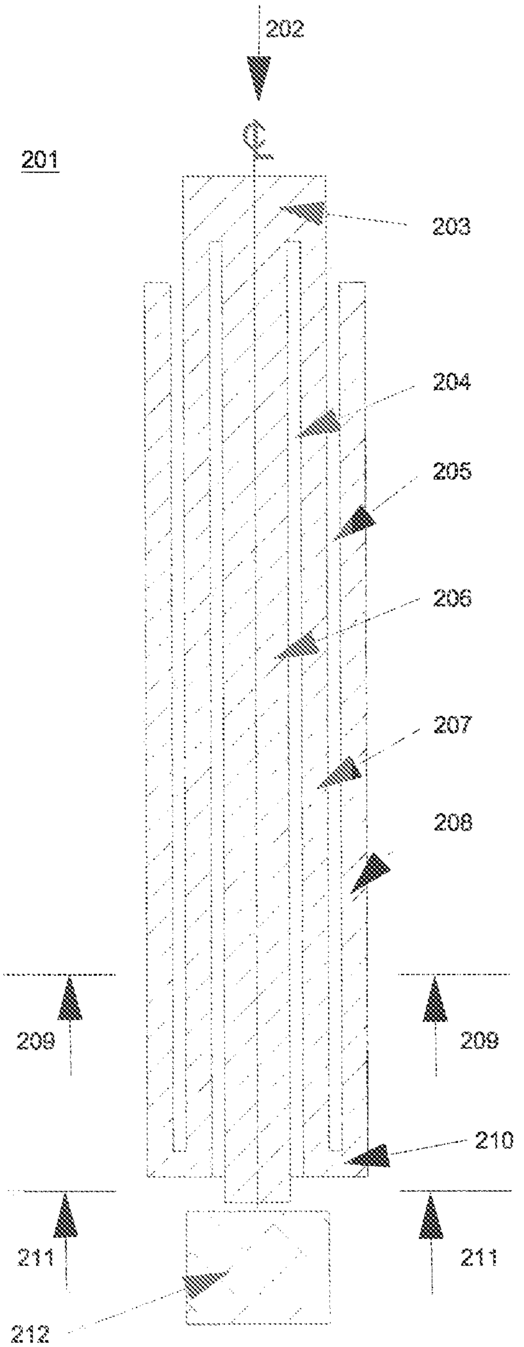
FIG. 2 shows a ruled Cleft-Mallet having two clefts and three long segments. The contact with the anvil, during impact, is by the lower part of the inner segment.

FIG. 2 shows a cross section, similar to FIG. 1, of a second example of a ruled Cleft-Mallet, generally indicated by reference numeral 201.

Figure 2A:
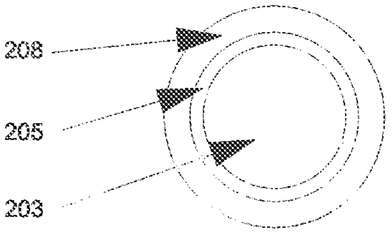
FIG. 2*a* is a top view of the Cleft-Mallet of FIG. 2.
Figure 2B:
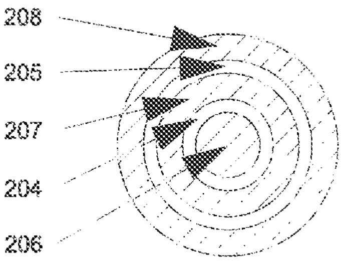
FIG. 2*b* and FIG. 2*c* are cross sections through the Cleft-Mallet of FIG. 2.
Figure 2C:
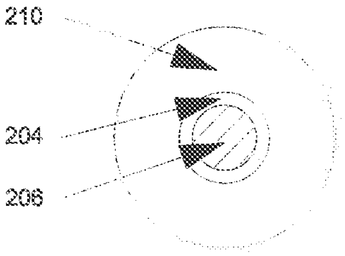

FIGS. 2*a*, 2*b*, 2*c* are a top view and cross sections, comparable to FIGS. 1*a*, 1*b*, 1*c*, of the second Cleft-Mallet 201, as indicated by arrows 202, 209 and 211, respectively.

The main structural difference between this second ruled Cleft-Mallet 201 and the first ruled Cleft-Mallet 101 of FIG. 1 is the presence of a further outer tube 208 that has its lower end connected to the lower end of a first tube 207.

The second Cleft-Mallet 201, which in the embodiment shown also has radial symmetry, has three linear-stressed, longitudinal segments 206, 207, 208, two radial shear stress segments 210, 203, and two clefts 204, 205 in between these segments. After impact, co-linear with the centre line of the mallet, between Cleft-Mallet 210 and anvil 212, a compression stress wave starts to propagate in the first segment 206 from the contact face upward in the direction of the second segment 203. This compression stress wave is transformed to a shear stress wave in the second segment 203, which propagates horizontally in the direction of the third segment 207. The shear stress wave is transformed to a tension stress wave in the transition from the second segment 203 to the third segment 207. The tension stress wave travels along the third segment 207, all the way to the fourth segment 210. In the transition to the fourth segment 210, the tension stress wave is transformed to a shear stress wave, which propagates horizontally in the direction of the fifth segment 208. In the transition from the fourth segment 210 to the fifth segment 208, the shear stress wave is transformed to a compression stress wave. This compression stress wave travels along the fifth segment 208, ail the way up, until the top end of the fifth segment 208.

This special structure of the Cleft-Mallet 201 in accordance with the present invention forces the stress wave to travel up and down three times, thus covering a travel length that is approximately equal to three times the external measured length of the second Cleft-Mallet 201. The time duration of the induced stress-wave in anvil 212 is, approximately, three times longer than the stress-wave duration of the same mallet but without the two clefts 204, and 206, i.e. a solid mallet with the same dimensions. As the stress-wave duration is longer, it is weaker. The result is, about, three times longer duration, with, about, in average, three times softer stress wave.

The three linear stress segments 206, 207, 208 may have different length, and different geometric parameters. The same regards the two clefts 204, and 205 they may have any geometric parameters as long as the functionality is kept. During impact, the contact face of Cleft-Mallet 201 is the lower part of the inner linear stress segment 206.

In further variations in accordance with the principles of the present invention, further tubes may be added, always connected at their top end or at their bottom end to the neighbouring previous tube, in alternating manner. Each such further tube adds a further linear stress segment, and a further shear stress segment, and a further cleft. The only essential feature here is the alternating manner of connecting the subsequent linear stress segments, such that a stress wave is forced to travel up and down in a zigzag pattern.

In the example shown in FIG. 2, the fifth segment 208 has an axial length shorter than the third segment 207. This is however not essential; the fifth segment 208 may have an axial length equal to or longer than said third segment 207.

In the same manner as mentioned in respect of the first example, when the final segment 208 extends above the other segments, it is possible that the mallet is used in opposite direction, as will be explained with reference to FIG. 3.

Figure 3:
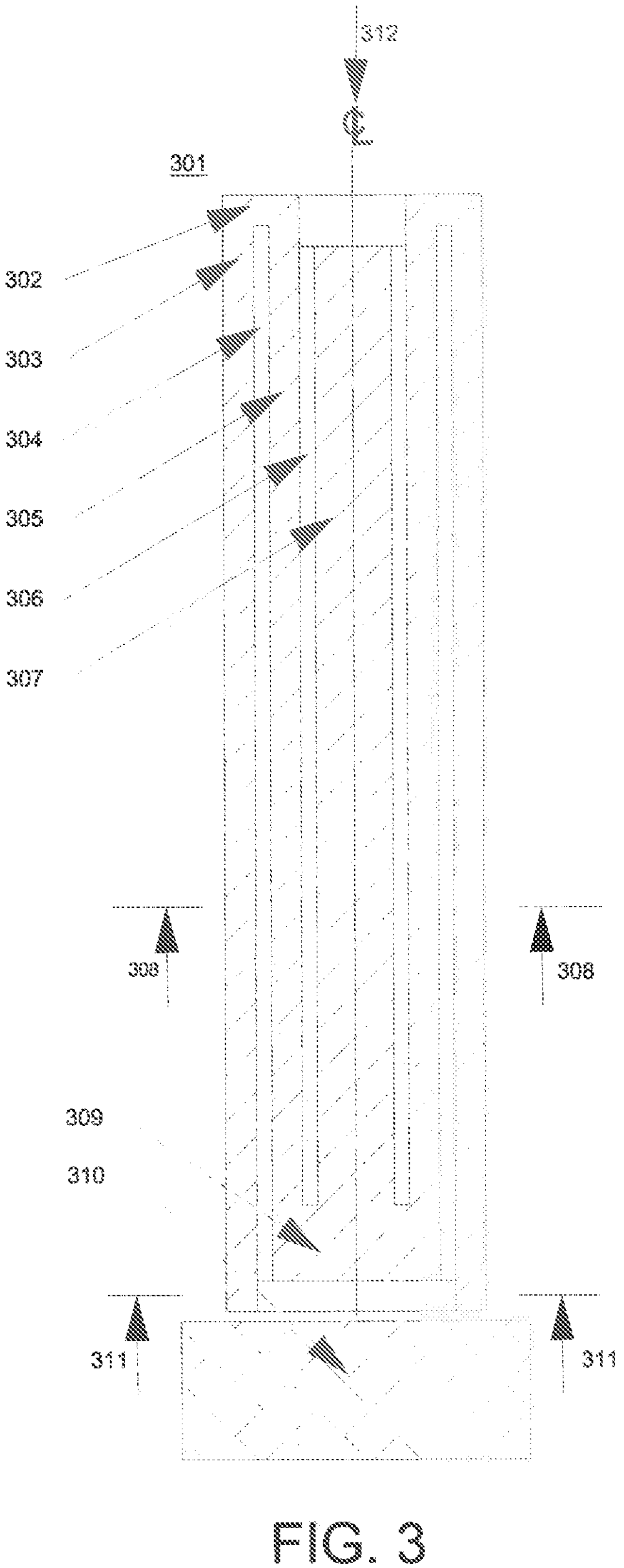
FIG. 3 shows a ruled Cleft-Mallet having two clefts and three long segments. The contact with the anvil, during impact, is by the lower part of the outer segment.

FIG. 3 shows a cross section, similar to FIG. 2, of a third example of a ruled Cleft-Mallet, generally indicated by reference numeral 301.

Figure 3A:
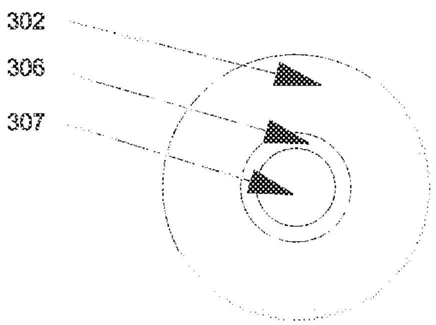
FIG. 3*a* is top view of the Cleft-Mallet of FIG. 3.
Figure 3B:
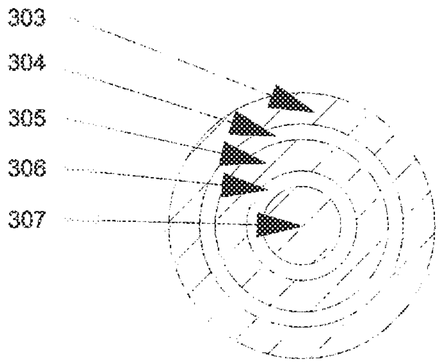
FIG. 3*b* and FIG. 3*c* are cross sections through the Cleft-Mallet of FIG. 3.
Figure 3C:
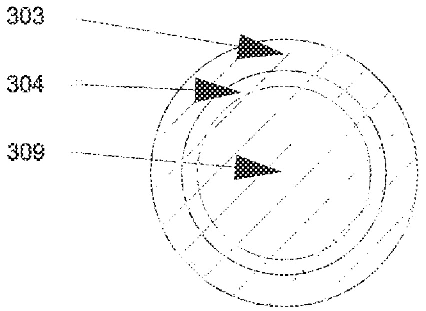

FIGS. 3*a*, 3*b*, 3*c* are a top view and cross sections, comparable to FIGS. 2*a*, 2*b*, 2*c*, of the third Cleft-Mallet 301, as indicated by arrows 312, 308 and 311, respectively.

The main structural difference between this third Cleft-Mallet 301 and the second Cleft-Mallet 201 of FIG. 2 is the fact that the free end of the outer tube 303 extends beyond the radial segment 309 and presents the contact face of the Cleft-Mallet. In this respect, the third Cleft-Mallet 301 may be considered an upside-down version of the second Cleft-Mallet 201 of FIG. 2.

The third Cleft-Mallet 301, which in the embodiment shown also has radial symmetry, has three longitudinal linear stress segments 303, 305, 307, two clefts 304, 306, and two radial shear stress segments 302, 309. The Cleft-Mallet strikes anvil 310, co-linear with the centre line. The contact face between deft-Mallet 301 and the anvil 310 is the lower part of the outer linear stress segment 303. The stress wave developed after strike starts as compression stress wave in the lower part of this first segment 303, propagates along first segment 303 up to shear segment 302, propagates as shear stress wave in second segment 302 towards the centre line until the third segment 305, propagates as tension stress wave along the third segment 305 down to shear stress segment 309, propagates as shear stress wave in fourth segment 309 towards the centre line until the fifth segment 307, and propagates as compression stress wave along the fifth segment 307, all the way up to the top of the fifth segment 307.

The linear stress segments 303, 305, 307 may have different geometric parameters, including different lengths. The shear stress segments 302, 309 may have different geometric parameters. In the embodiment shown, the top of the fifth segment 307 lies recessed with respect to the second segment 302, but it may also lie flush with or extend above the second segment 302.

In the same manner as mentioned with respect to the second embodiment 201, it is possible to have more, or less, than three linear stress segments, and, accordingly, more, or less, shear stress segments, and clefts—as long as the zig-zag structure connecting in between them is kept.

As the stress wave propagation length within the third Cleft-Mallet 301 is, approximately, three times the outside length of the Cleft-Mallet, the stress wave duration is, about, three times longer than for the same mallet but without the two clefts 304, 306, i.e. a solid mallet with the same dimensions. Having the stress wave duration time being three times longer means that the average stress wave intensity is, about, one-third.

In many practical applications, the anvil will have a substantially flat contact surface for the mallet to interact with, and that will in many situations be a top surface, as shown in the illustrations, in those cases, the mallet's contact face will be at an axial extremity of the mallet, as mentioned in the above. That is however not essential.

The anvil may have a contact surface that lies raised above its surroundings, or the anvil may be relatively narrow and standing upright, such as for instance a pile. In such case, the mallet's contact face may be recessed within the mallet, with parts of the mallet extending around, or on opposite sides of, an upper portion of the anvil. An example will be discussed with reference to FIGS. 5 and 25.

Oppositely, it is possible that the anvil has an annular contact face surrounding a recess or even a hole in the anvil. In such case, the mallet's contact face may be raised at the outer circumference of the mallet, with parts of the mallet extending down into said recess or hole. An example will be discussed with reference to FIGS. 4 and 24.

Figure 25:
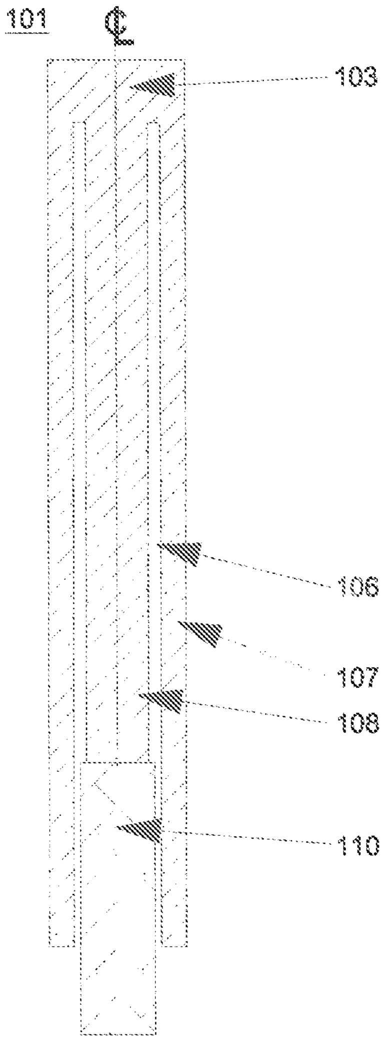
FIG. 25 shows a rotation symmetric ruled Cleft-Mallet having one deft and two long segments. The inner segment is shorter than the outer segment. The inner segment strikes the anvil.

FIG. 25 schematically shows a modification of the ruled Cleft-Mallet 101 as already discussed with reference to FIG. 1. In this modification, the first segment 108 is shorter than the third segment 107 so that the Cleft-Mallet's contact face (which is the lower free surface of the first segment 108) lies at a raised level. The anvil 110 in this example, for instance a pile, fits within the third segment 107.

The operation of the Cleft-Mallet of FIG. 25 is basically the same as the operation of the Cleft-Mallet of FIG. 1, and the description thereof does not need to be repeated here.

It is noted that a similar modification can be made to other mallets according to the present invention, for instance the second Cleft-Mallet 201 of FIG. 2.

Figure 24:
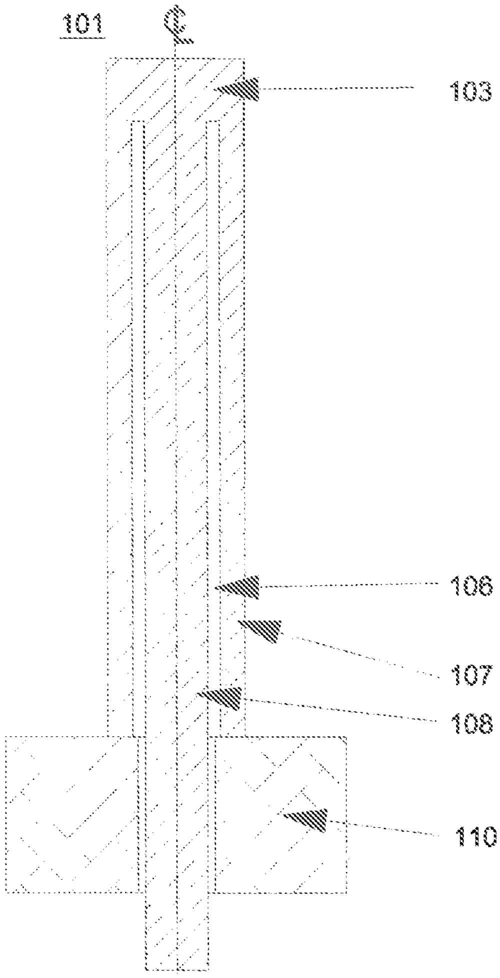
FIG. 24 shows a rotation symmetric ruled Cleft-Mallet having one deft and two long segments. The inner segment is longer than the outer segment. The anvil has hole, in which the inner segment is through. The lower part of the outer segment strikes the anvil.

FIG. 24 schematically shows another modification of the ruled Cleft-Mallet 101 as already discussed with reference to FIG. 1. In this modification, similar to the third Cleft-Mallet 301 of FIG. 3, it is the outermost segment 107 that functions as the first segment to contact the anvil, and, similar to the modification of FIG. 25, the first segment 107 is shorter than the third segment 108 so that the Cleft-Mallet's contact face (which is the lower free surface of the first segment 107) lies at a raised level. The anvil 110 in this example, has a hole into which fits the third segment 108.

The operation of the Cleft-Mallet of FIG. 24 is basically the same as the operation of the Cleft-Mallet of FIG. 1, except that the stress waves now propagates from outside to inside, and the description of this operation does not need to be repeated here.

It is noted that a similar modification can be made to other mallets according to the present invention, for instance the third Cleft-Mallet 301 of FIG. 3.

Figure 4:
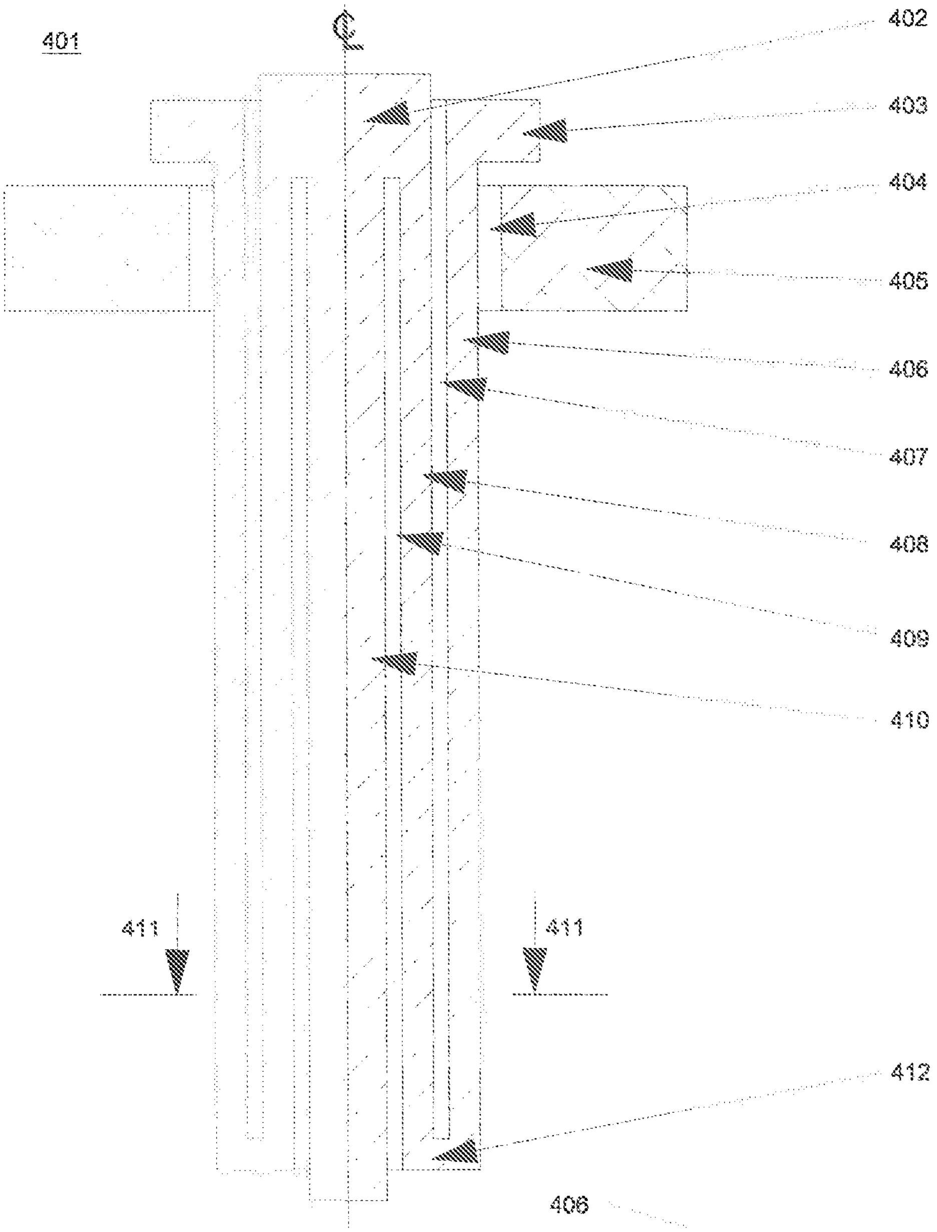
FIG. 4 shows a ruled Cleft-Mallet having three clefts, three long segments and three shearing segments. The contact with the anvil, during impact, is by the lower part of the outer, shearing, segment. The anvil has hole through which the Cleft-Mallet passes.
Figure 5:
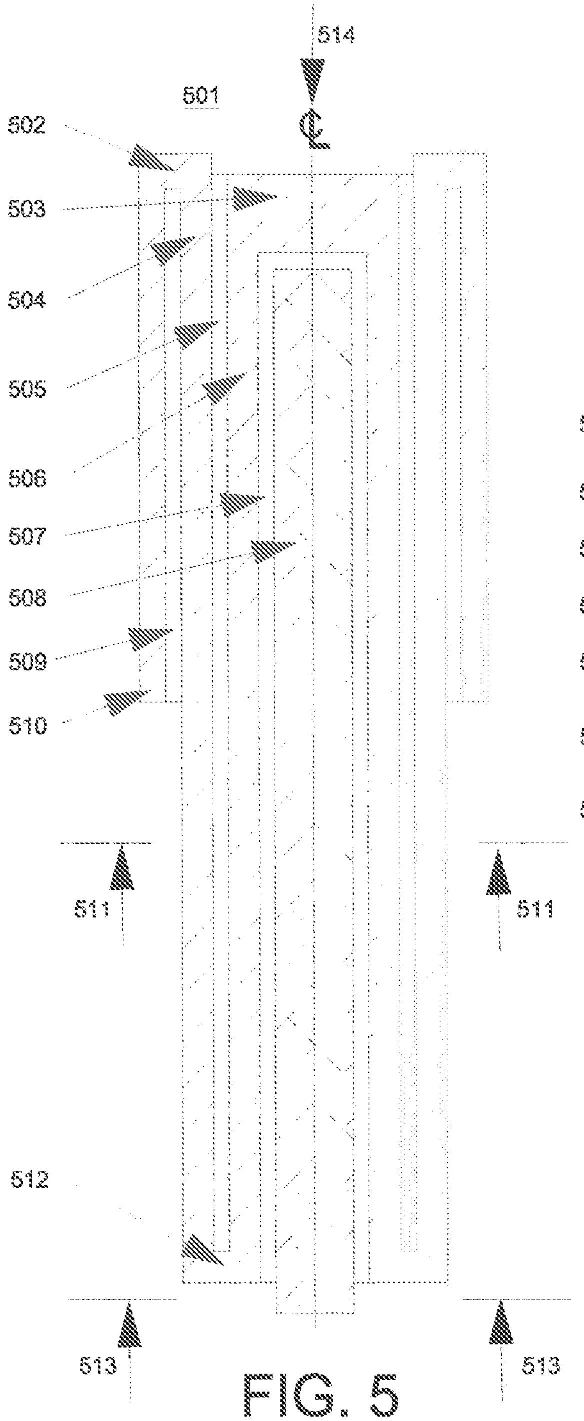
FIG. 5 shows a ruled Cleft-Mallet having three clefts and three long segments. The contact with the anvil, during impact, is by the lower part of the inner, shearing, segment.

Whatever the configuration of the Cleft-Mallet, and with reference to the exemplary embodiments of FIGS. 24 and 25, it will be clear that the first segment (which is defined as the segment that hits the anvil) can be made shorter and shorter. FIGS. 4 and 5 schematically show embodiments that illustrate the extrapolation of such length reduction to the extreme of zero length.

In FIG. 4, the resulting configuration can be described as a first longitudinal segment 406 having an outer circumferential flange 403 at its free end, wherein the contact face of the Cleft-Mallet is the annular lower surface of this flange 403 directed towards to opposite end of the first segment 406. Likewise, in FIG. 5, the resulting configuration can be described as a first longitudinal segment 506 having a bottom 503 closing its free end, wherein the contact face of the Cleft-Mallet is the interior (i.e. lower) bottom surface of this bottom 503, i.e. the surface directed towards to opposite end of the first segment 506.

It is noted that the outer circumferential flange 403 does not need to be boated at the free end of the first segment; it may in fact be located anywhere along the length of the first segment 406. Likewise, the bottom 503 does not need to be boated at the free end of the first segment; it may in fact be located anywhere along the length of the first segment 506.

When considering the stress waves travelling in what are now termed the first segments 406 and 506, it should be clear that these are tension waves, in contrast to the compression waves discussed with reference to the first segments in FIGS. 1 and 2.

However, it is also possible that said outer circumferential flange 403 and said bottom 503, respectively, are considered to be radial first segments, and that consequently the initial stress waves are shear waves.

Depending on the level of detail one wishes to use in the description of the operation, one might even say that, at the location of impact, the generated wave will initially be a compression wave, immediately transformed into a shear wave (in said outer circumferential flange 403 and said bottom 503, respectively), which is then transformed into a tension wave at the entrance of the second segment 406 and 506, respectively. Anyway, once inside the longitudinal segment 406 and 506, respectively, the stress wave is a tension wave.

Figure 4A:
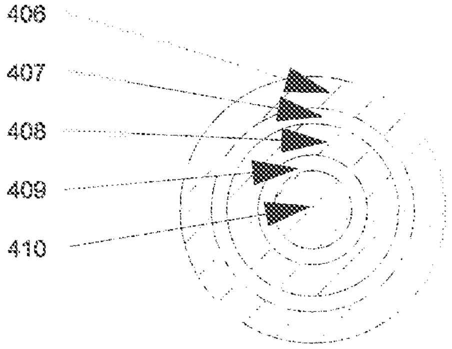
FIG. 4*a* is a cross section through the Cleft-Mallet of FIG. 4.

FIG. 4 shows a longitudinal cross section, collinear with the centre line, CL, of a fourth example of a ruled Cleft-Mallet, generally indicated by reference numeral 401. FIG. 4*a* is cross section of the fourth Cleft-Mallet 401, as indicated by arrows 411.

This fourth Cleft-Mallet 401, which in the embodiment shown also has radial symmetry, strikes anvil 405. Anvil 405 has a hole, through which the Cleft-Mallet 401 extends. The Cleft-Mallet 401 has three linear stress segments 406, 408, 410, three clefts 407, 404, 409, and three shear stress segments 402, 412, 403.

Reference numeral 404 indicates the play between the Cleft-Mallet 401 and the anvil 405, and at the same time indicates a deft between segment 403 and segment 406.

During impact, the lower surface of shear stress portion 403 comes into contact with the upper surface of anvil 405. The stress wave starts as a compression wave at the lower surface of first segment 403, propagates in the direction of the upper part of second segment 406 while transforming to a shear stress wave and then to a tension stress wave, propagates as a tension stress wave down through second segment 406 to third segment 412, propagates as a shear stress wave through radial third segment 412 in the direction of fourth segment 408, propagates as a compression stress wave up through longitudinal fourth segment 408 in the direction of radial fifth segment 402, propagates as a shear stress wave through fifth segment 402 in the direction of longitudinal sixth segment 410, and propagates as a tension stress wave down through sixth segment 410 until the end. The number of linear stress segments, and, accordingly, the number of shear stress segments, and clefts, are not limited—as long as the zig-zag structure is kept.

Shear stress segment 403 may be located anywhere along linear stress segment 406.

Figure 5A:
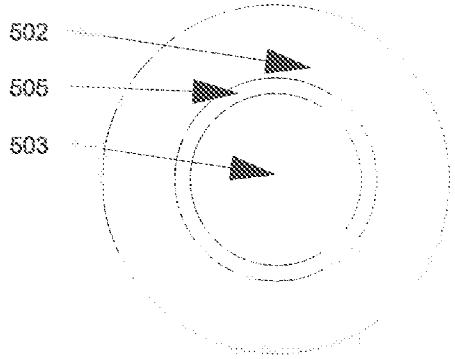
FIG. 5*a* is top view of the Cleft-Mallet of FIG. 5.
Figure 5B:
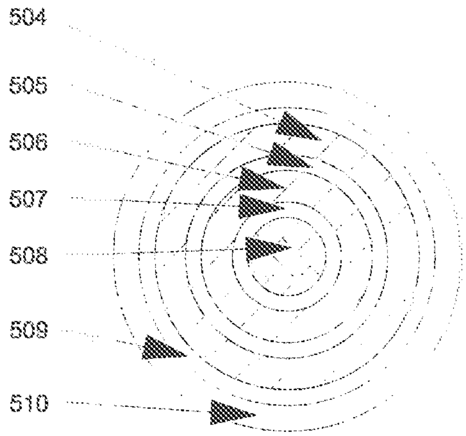
FIG. 5*b* and FIG. 5*c* are cross sections through the Cleft-Mallet of FIG. 5.
Figure 5C:
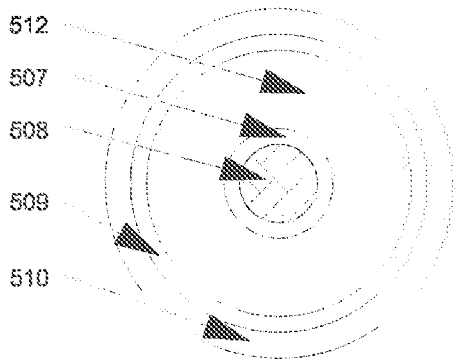

FIG. 5 shows a longitudinal cross section, collinear with the centre line CL, of a fifth example of a ruled Cleft-Mallet, generally indicated by reference numeral 501. FIGS. 5*a*, 5*b* and 5*c* are a top view and cross sections as indicated by arrows 514 and 511, 513, respectively.

This fifth Cleft-Mallet 501, which in the embodiment shown also has radial symmetry, has three linear stress segments 510, 504, 506, three clefts 509, 505, 507, and three shear stress portions 502, 512, 503. During impact of the fifth Cleft-Mallet 501 on anvil 508, the upper surface of anvil 508 contacts the lower surface of shear stress segment 503, initialing a stress wave, which propagates though first segment 503 in the direction of second segment 506, down through second segment 506 as a tension stress wave in the direction of third segment 512, through third segment 512 as a shear stress wave in the direction of fourth segment 504, up through fourth segment 504 as a compression stress wave in the direction of fifth segment 502, through fifth segment 502 as a shear stress wave in the direction of sixth segment 510, down through sixth segment 510 as a tension stress wave until the end. The number of linear stress segments, and, accordingly, the number of shear stress segments, and clefts, are not limited as long as the zig-zag structure is kept.

Reference numeral 507 indicates the play between second segment 506 and anvil 508, as well as the deft between first and second segments 503 and 506.

The Cleft-Mallets discussed so far can be indicated as single-operation mallets, indicating that they are intended for colliding with an anvil while travelling in one direction only. A single-operation Cleft-Mallet has one contact face. It is however also possible to have a double-operation Cleft-Mallet, having two contact faces, intended for colliding with an anvil while travelling in either one of two opposite directions. An example of such double-operation ruled Cleft-Mallet 601 is illustrated in FIGS. 6 and 6*a*.

Figure 6:
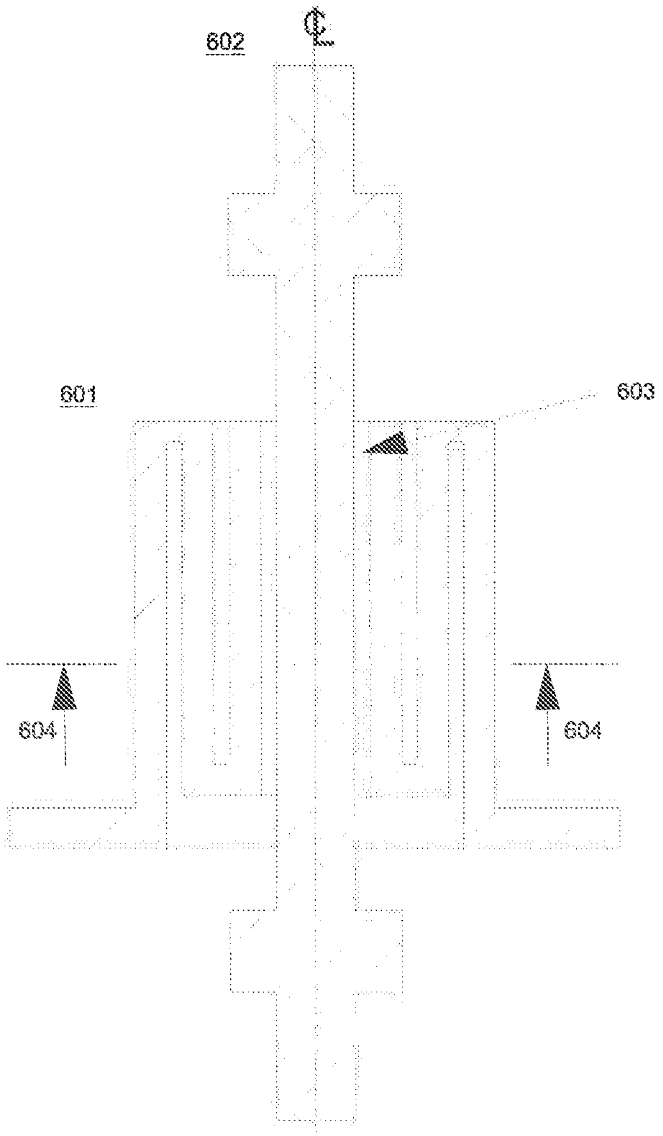
FIG. 6 shows a ruled Cleft-Mallet having three clefts, three long segments and one shear segment. This Cleft-Mallet is double-acting—it strikes the anvil at both sides.
Figure 6A:
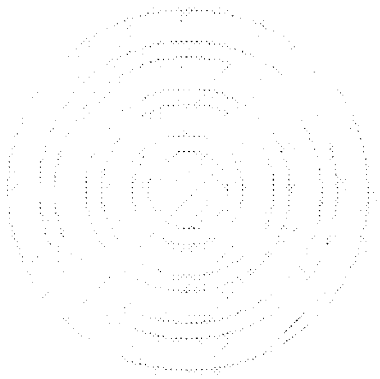
FIG. 6*a* is a cross section through the Cleft-Mallet of FIG. 6.

FIG. 6 shows a longitudinal cross section, collinear with the centre line CL, of this double-operation ruled Cleft-Mallet 601, and FIG. 6*a* is cross section as indicated by arrows 604.

This double-operation Cleft-Mallet 601, which in the embodiment shown also has radial symmetry, is for cooperation with an elongate anvil 602 extending through the Cleft-Mallet and having two opposite enlargements of increased diameter. Reference numeral 603 indicates the tolerance between Cleft-Mallet 601 and anvil 602. Cleft-Mallet 601 slides along anvil 602, between the two enlargements of anvil 602, and may strike each of them. Like the embodiments discussed before, the Cleft-Mallet 601 may have a radial structure with rotational symmetry, of tubes arranged within another and attached to each other at alternating ends. While the figure shows three linear stress segments, the Cleft-Mallet $01 may have any number of linear stress segments, and, accordingly, shear stress segments, and clefts as long as the zig-zag structure is kept.

It is noted that the double-operation of Cleft-Mallet 601 is not symmetric. While the upward strike of cleft-mallet 601 activates three linear stress segments in series, the downward strike activates two longitude linear stress segments in series, and one longitude linear stress segment in parallel.

It is clear that cleft-mallet 601 may be structured as to have symmetric double-operation. As an example, the second shear stress segment which connects the first linear segment and the third linear segment at their lower ends, may connect the above linear segments at the half of their length.

Figure 8:
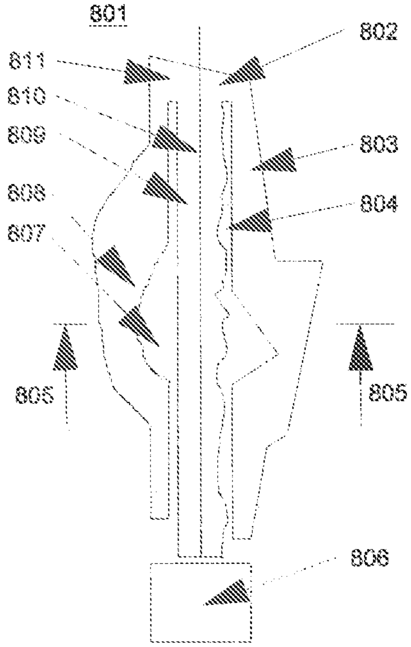
FIG. 8 shows a ruled Cleft-Mallet having two clefts and three long segments. The segments, as well as the clefts, have no regular shape.
Figure 8A:
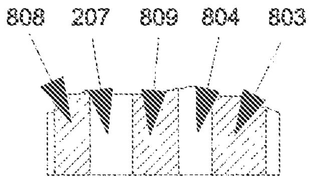
FIG. 8*a* is a cross section through the Cleft-Mallet of FIG. 8.

For ease of understanding, most of the Cleft-Mallets described herein are symmetric, and with segments which are parallel, or perpendicular, to the centre line. In real, the segments may have any shape, any geometry, including one or more bosses and/or one or more cavities, and any symmetry, if at all—as long as they fulfil their functionality as segments. FIG. 8 shows an example of a non-symmetric, non-regular shaped, planar, ruled Cleft-Mallet 801, having three linear stress segments 803, 809, 808, two clefts 804, 807, and two shear stress segments 802, 811, which strikes anvil 806 along line 810, FIG. 8*a* is cross section 805 through Cleft-Mallet 801.

The cleft, or clefts, are the key point for the functionality of the Cleft-Mallets. They force the stress wave, or waves, to change directions and types, and to have a propagation path through the mallet that is longer than through a mallet without them.

There are no references to stress wave's echoes, and back propagating stress waves, in this patent application, as it is beyond the scope of this patent application, and does not assist to understand the present invention. The detailed geometry of the transformation from one type of stress to other type of stress is not important for the sake of this patent application, nor for better understanding.

In the above explanation, segments have for instance been indicated as linear stress segment or shear stress segment. This may suggest that the stress waves in these segments are exclusively linear stress waves or shear stress waves, respectively, but this is not necessary. There may be shear stress components in linear stress segment, and/or linear stress components in shear stress segment, and/or shear stress components in torsion stress segment, and/or torsion stress segments in shear stress segment.

As it regards to this patent application, just the different types of stresses, in between two adjacent segments, counts. The kinds of different stress types are between linear stress and shear stress, or between compression stress and tension stress, or between positive-shear stress and negative-shear stress, or between nom shear stress and shear stress, or between no-linear stress and linear stress, or between shear stress and torsion stress, or between positive-torsion stress and negative torsion stress, or between no-torsion stress and torsion stress.

Ruled Cleft-Mallets 201 in FIG. 2, 301 in FIG. 3, 401 in FIG. 4, 501 in FIG. 5, and 601 in FIG. 6 are the five basic structures for rued Cleft-Mallets based on linear stress. The time duration of the stress wave created by the strike of those Cleft-Mallets on an anvil is mostly due to the propagating time of linear stress waves, because in these embodiments the longitudinal extent of the segments with linear stress is much larger that the radial extent of the connection portions with shear stress. There are however also designs where the time duration of the stress wave created by the strike of the Cleft-Mallet on an anvil is mostly due to the propagating time of shear stress waves, as will be discussed by way of example with reference to FIG. 7.

Figure 7:
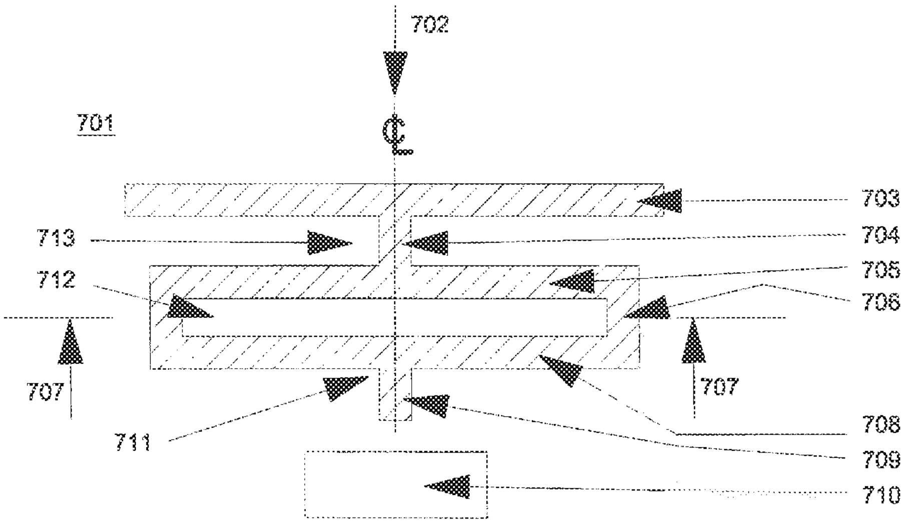
FIG. 7 shows a ruled Cleft-Mallet having three clefts and three wide segments. This Cleft-Mallet has rotation symmetric.
Figure 7A:
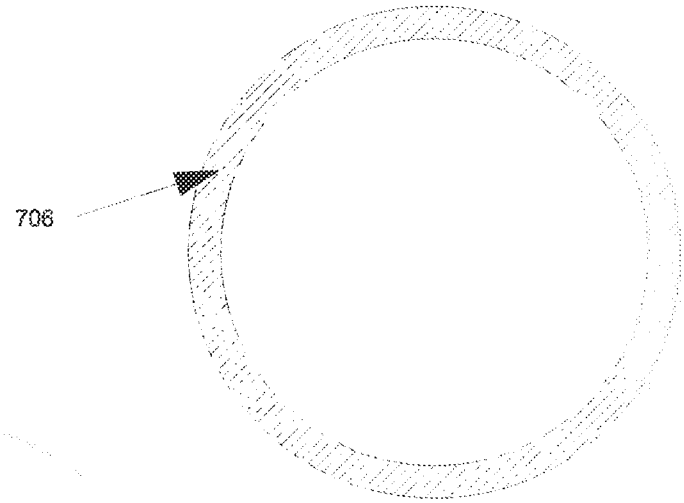
FIG. 7*a* is a cross section through the Cleft-Mallet of FIG. 7.
Figure 7B:
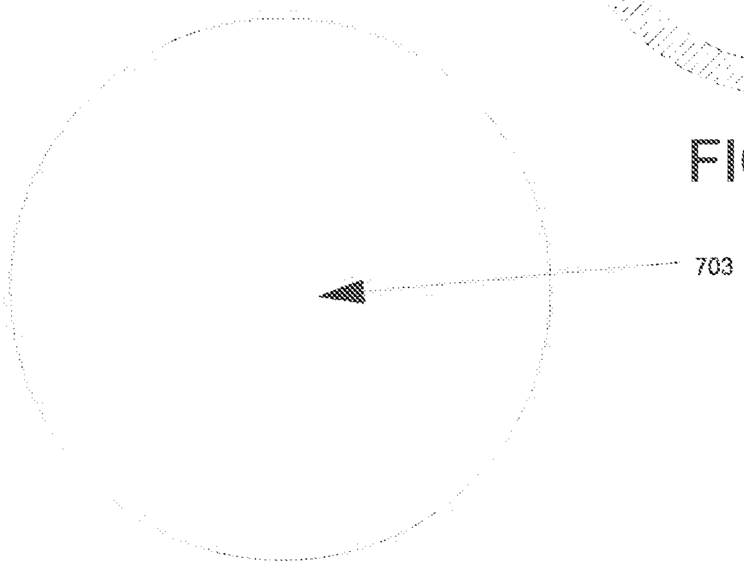
FIG. 7*b* is a top view of the Cleft-Mallet of FIG. 7.

FIG. 7 shows a longitudinal cross section, co-linear with the centre line, of a ruled Cleft-Mallet 701 that, in the embodiment shown, is radial-symmetric. FIG. 7*a* is cross section 707 through Cleft-Mallet 701. FIG. 7*b* is top view 702 of Cleft-Mallet 701.

This Cleft-Mallet 701, which strikes on anvil 710, has three short linear stress segments 704, 706, 709, three wide, shear stress segments 703, 705, 708, and three clefts 713, 712, 711. The contact face of this Cleft-Mallet 701, during impact, is the lower surface of first segment 709. The compression stress wave created during the impact propagates from the contact face up through first segment 709, then it propagates horizontally (radially outwards) in second segment 708 towards third segment 706 as shear stress wave, then it propagates up as compression stress wave through third segment 706 towards fourth segment 706, then it travels horizontally (radially inwards) as shear stress wave towards fifth segment 704, there it propagates up towards sixth segment 703 as compression stress wave, and the final propagate is through sixth segment 703 horizontally (radially outwards) as shear stress wave, perpendicular to the direction of the centre line. Most of the long time duration of the stress wave is due to shear stress waves travelling perpendicular to the centre line, which is the impact vector as well. The number of shear stress segments, and accordingly, the number of linear stress segments, and clefts, are not limited.

For the purposes of the present invention, Cleft-Mallets do not need to be symmetric, as mentioned before. It is particularly not essential that the strike line is a line of symmetry.

Figure 9:
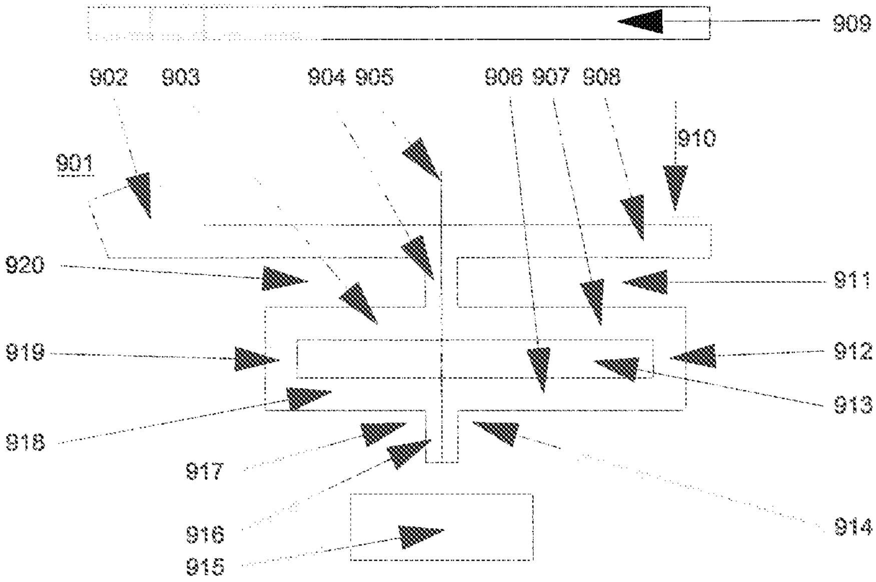
FIG. 9 shows a planar, ruled, Cleft-Mallet having five clefts, and long shear-stressed segments. Most of the length of the induced wave is due to shear.

By way of example, FIG. 9 shows a planar ruled Cleft-Mallet 901, having four linear stress segments 916, 912, 919, 904, six shear stress segments 902, 908, 903, 907, 906, 918, and 5 clefts 914, 917, 913, 911, 920, which strikes, through impact vector 905, on anvil 915, 909 is a top view 910 of this Cleft-Mallet 901. During impact, after having contact between the anvil 915 and the lower surface of first segment 916, a compression stress wave propagates upward, towards segments 906 and 918. This compression stress wave becomes to be two shear stress waves propagating, horizontally, to the opposite directions, namely a first shear stress wave propagating through a second segment 906 towards a fourth segment 912, and a second shear stress wave propagating through a third segment 918 towards a fifth segment 919. The first shear stress wave propagates through second segment 906, all the way to fourth segment 912, there it becomes to be a first compression stress wave propagating upward, through fourth segment 912 until a sixth segment 907, there it becomes to be a third shear stress wave propagating along sixth segment 907, all the way to eighth segment 904. At the same time, the second shear stress wave becomes to be a second compression stress wave propagating upward through fifth segment 919, towards seventh segment 903, there it becomes to be a fourth shear stress wave, which propagates along seventh segment 903 until eighth segment 904. At the junction of segments 907, 903 and 904, the third and fourth shear stress waves combine and become to be a compression stress wave propagating upward through segment eighth 904 until the junction with ninth and tenth segments 908 and 902. At the junction of segments 904, 902, and 908, the compression stress wave becomes to be two shear stress waves, which propagate, to the opposite directions, through ninth segment 908 to the right and through tenth segment 902 to the left, all the way to both ends.

It will thus be seen that a stress wave propagation path in a Cleft-Mallet can comprise segment propagation paths that, as far as functional propagation is concerned, are arranged in parallel.

Ruled Cleft-Mallet 901 is not symmetric around the strike line 905. As a result, Cleft-Mallet 901 induces in anvil 915 not just vertical compression stress wave, but horizontal forces, and moments, as well. The static centre of gravity of Cleft-Mallet 901 is coincident with the strike line. It means that, statically, Cleft-Mallet 901 is balanced. As it relates to the stress waves developing during the strike, Cleft-Mallet 901 is not balanced, and it has horizontal forces, and moments, as well.

Ruled Cleft-Mallet 701 in FIG. 7, and 901 in FIG. 9, are based, mainly, on shear stress. Most of the time duration, of the strike impact, is due to shear stress waves travelling time duration. In general, shear stress based Cleft-Mallets are wider, and shorter, than linear stress based Cleft-Mallets.

Cleft 913 in FIG. 9, as an example, is, actually, a combination of four clefts, namely, the clefts between segments 912 and 906, 918 and 919, 919 and 903, and between segments 907 and 912. Another example is deft 713 in FIG. 7. This deft is a combination of two clefts—the deft between segments 703 and 704, and the deft between segments 704 and 705. One more example is the deft 106 in FIG. 1. This deft is a combination of two clefts—the deft between segments 108 and 103, and the cleft between segments 103 and 107. The reason for combining clefts together is simplicity of understanding. The observer sees one gap, or one cleft, which separates the relevant segments. It is possible to spot such general cleft into local clefts, but on the one hand, this will not assist the understanding, and, on the other hand, this will make the figure more bulky.

Cleft-Mallets may be produced from any material, or any combination of materials—as long as the material, or the combination of materials, is capable to withstand the developing stresses during the impact. The potential materials are for instance but not exclusively: steel, lead, tin, stainless steel, bronze, thermo-plastic, polymer, composite-materials, rubber, wood, and/or any combination of them. Different segments of the Cleft-Mallet may be made from different materials. Any segment of the Cleft-Mallet may comprise more than one material.

In the embodiments discussed so far, the segments define propagation paths either parallel to or perpendicular to the strike line, and the stress waves travelling along those propagation paths are either predominantly linear stress waves or predominantly shear stress waves. It is however also possible to have embodiments where the propagation paths make any angles, not just 0° and/or 90°, with the strike line.

Figure 10:
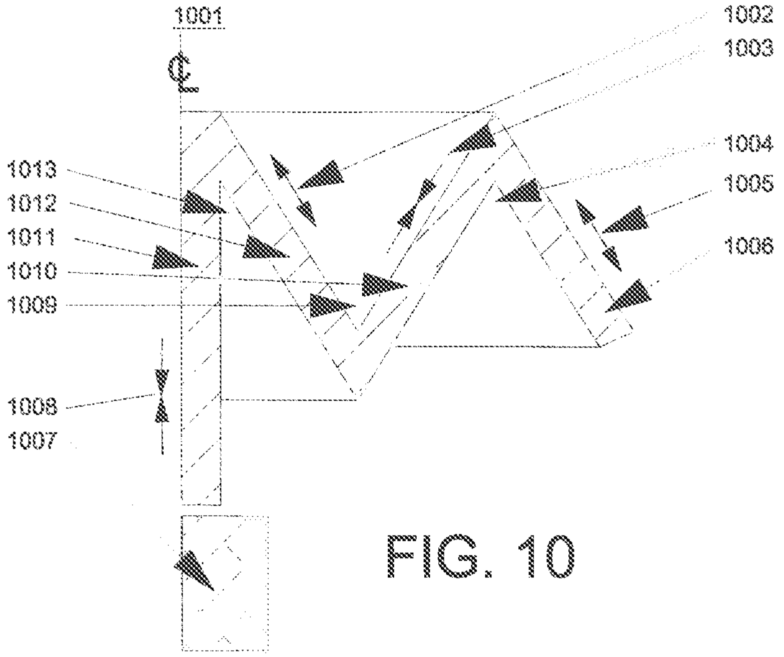
FIG. 10 shows a rotation symmetric ruled Cleft-Mallet having three clefts, one linear-stressed segment, and three segments having a combination of shear stress and linear stress.

FIG. 10 shows a cross section, co-linear with the centre line, of a radial symmetric ruled Cleft-Mallet 1001, which strikes on anvil 1007; in view of the symmetry, the figure only shows one half of the mallet. Cleft-Mallet 1001 has one linear stress segment 1011, three segments 1012, 1010, 1006 having shear stress waves and linear stress waves in combination, and three clefts 1013, 1009, 1004. Each of the segments 1012, 1010, 1006 can be described as a portion of a cone having its apex coinciding with the centre line.

During impact, the lower surface of first segment 1011 comes in contact with anvil 1007, and a compression stress wave starts propagating along segment 1011 towards the entrance of second segment 1012. In the transition from the first segment 1011 to the second segment 1012, this compression stress wave is transformed to a combination of a tension stress wave 1002 and a negative-shear stress wave (not indicated), which propagate along the second segment 1012 towards the third segment 1010. In the transition from the second segment 1012 to the third segment 1010, the tension stress wave 1002 and the negative-shear stress wave are transformed to a compression stress wave 1003 and a negative-shear stress wave (not indicated), which propagate along the third segment 1010 towards the fourth segment 1006. In the transition from the third segment 1010 to the fourth segment 1006, the compression stress wave 1003 and the negative-shear stress wave are transformed to a tension stress wave 1005 and a negative-shear stress wave (not indicated) which propagate along the fourth segment 1006 all the way to the end.

The negative-shear stresses in segments 1012, 1010, 1006 have the same type—this is the reason why they are not explicitly indicated in FIG. 10. The linear stress changes types in each adjacent segments 1011, 1012, 1010, 1006. The linear stress is compression stress 1008 in first segment 1011, tension stress 1002 in second segment 1012, compression stress 1003 in third segment 1010, and tension stress 1005 in fourth segment 1006.

It is noted that in FIG. 10 the transition portions between successive segments are shown as sharp corner portions, having almost no radial extent. It is however also possible that these transition portions have a more rounded design, With a larger radial extent. It will then in fact be possible to indicate a part where the propagation direction is predominantly perpendicular to the centre line and the linear stress component is substantially absent. Similar remarks apply, mutatis mutandis, to other embodiments.

Figure 11:
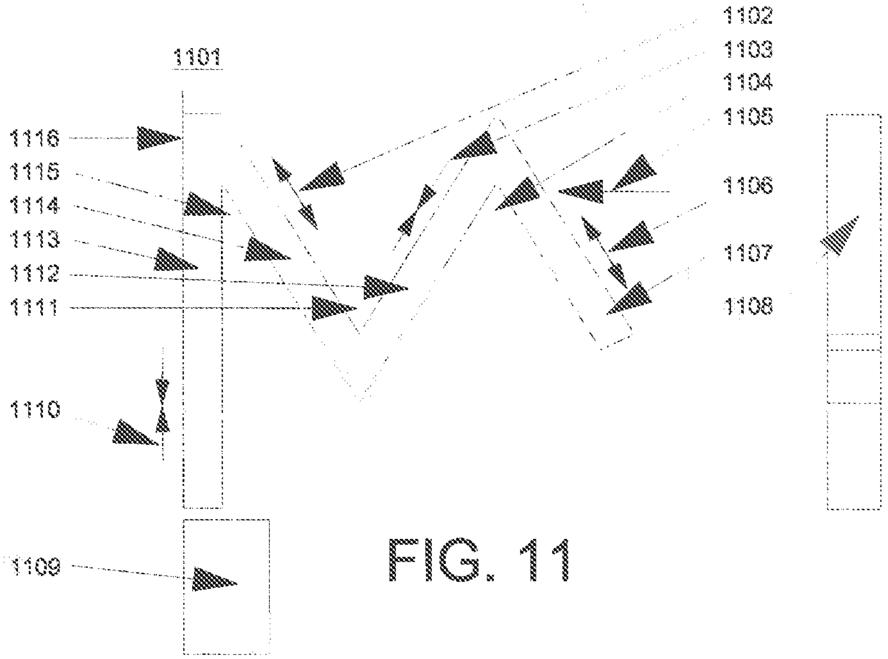
FIG. 11 shows a planar, linear-symmetric ruled Cleft-Mallet having six clefts, one linear-stressed segment, and six segments having a combination of shear stress and linear stress.

FIG. 11 schematically shows a ruled Cleft-Mallet 1101 that has a design similar to the Cleft-Mallet 1001 shown in FIG. 10, but that is planar instead of three-dimensional, and that is mirror-symmetric about centre line 1116 instead of rotation-symmetric. Cleft-Mallet 1101 strikes on anvil 1109 along line 1116. Cleft-Mallet 1101 has one linear stress segment 1113, six segments having shear stress, and linear stress, 1114, 1112, 1107 (three are not shown in FIG. 11), and six clefts 1115, 1111, 1104 (three are not shown in FIG. 11). During impact, the lower surface of segment 1113 comes in contact with anvil 1109, and compression stress wave 1110 starts propagating along segment 1113 direction segment 1114. This compression stress wave transforms to tension stress 1102, and negative-shear stress, waves, which propagate along segment 1114, direction segment 1112. The tension stress 1102, and negative-shear stress, waves transform to compression stress 1103, and negative-shear stress, waves, which propagate along segment 1112 direction segment 1107. The compression stress 1103, and negative-shear stress, waves transform to tension stress 1106, and negative-shear stress, waves, which travel along segment 1107 all the way to the end. 1108 is side view 1105 of Cleft-Mallet 1101.

The negative-shear stresses in segments 1114, 1112, 1107, have the same type—this is the reason they are nor appearing on FIG. 11. The linear stress changes types in each adjacent segments 1113, 1114, 1112, and 1107. Compression stress 1110 in segment 1113, tension stress 1102 in segment 1114, compression stress 1103 in segment 1112, and tension stress 1106 in segment 1107.

The same above description is valid for the symmetric parts of Cleft-Mallet 1101 which are not shown in FIG. 10. The only change is that the negative shear stresses, as described above, are positive shear stress in the non-showed segments.

Figure 12:
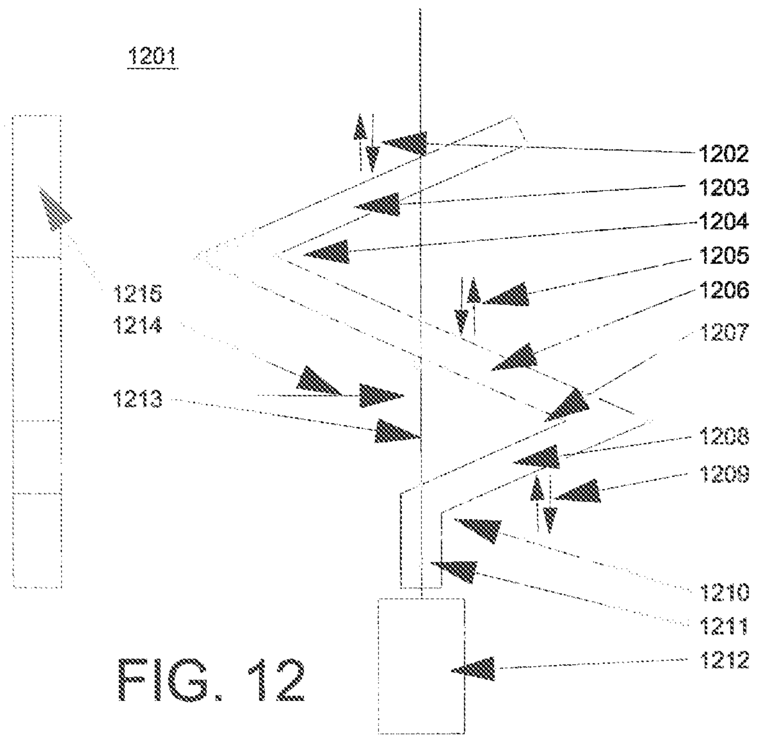
FIG. 12 shows a planar ruled Cleft-Mallet having three clefts, one linear-stressed segment, and three segments having a combination of shear stress and linear stress.

FIG. 12 shows a planar ruled Cleft-Mallet 1201, which strikes on anvil 1212 along line 1213. Cleft-Mallet 1201 has one linear stress segment 1211, three segments 1208, 1206, 1203 having shear stress waves and linear stress waves in combination, and three clefts 1210, 1207, 1204. During impact, the lower surface of first segment 1211 comes in contact with anvil 1212, and a compression stress wave starts propagating along first segment 1211 towards the entrance of second segment 1208. In the transition from the first segment 1211 to the second segment 1208, this compression stress wave transforms to a combination of a compression stress wave and a negative-shear stress wave 1209, which propagate along the second segment 1208 towards the third segment 1206. In the transition from the second segment 1208 to the third segment 1206, the compression stress wave and the negative-shear stress wave 1209 transform to a compression stress wave and a positive-shear stress wave 1205, which propagate along the third segment 1206 towards the fourth segment 1203. In the transition from the third segment 1206 to the fourth segment 1203, the compression stress wave and the positive-shear stress wave 1205 transform to a compression stress wave and a negative shear stress wave 1202, which propagate along the fourth segment 1203 all the way to the end. 1215 is side view 1214 of Cleft-Mallet 1201.

The compression stresses in segments 1211, 1208, 1206 and 1203, have the same type—this is the reason why compression stress symbols are nor appearing on FIG. 12. The shear stresses change types in each adjacent segments 1211, 1208, 1206, 1203. The stress is no-shear stress in first segment 1211, negative-shear stress 1209 in second segment 1208, positive-shear stress 1205 in third segment 1206, and negative-shear stress 1202 in fourth segment 1203.

Figure 13:
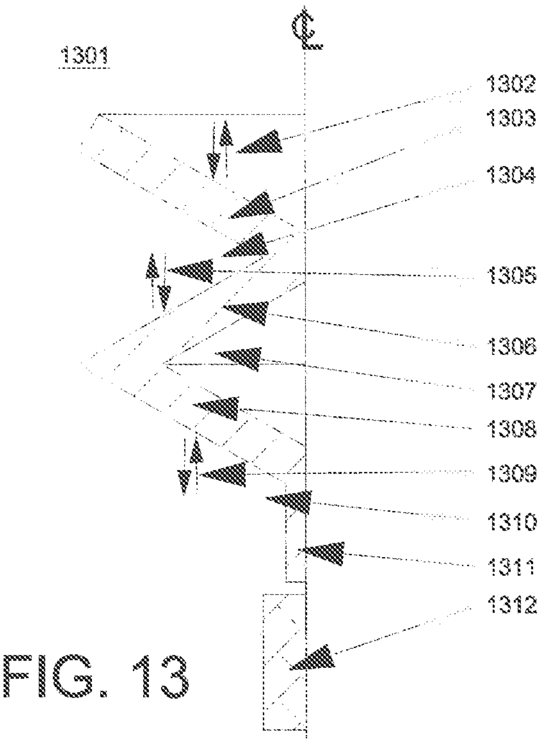
FIG. 13 shows a rotation symmetric ruled Cleft-Mallet having three clefts, one linear stressed segment, and three segments having a combination of shear stress and linear stress.

FIG. 13 shows a radial symmetric rued Cleft-Mallet 1301, which strikes on anvil 1312 along the centre line. Cleft-Mallet 1301 has one linear stress segment 1311, three segments 1308, 1306, 1303 having shear stress waves and linear stress waves in combination, and three clefts 1310, 1307, 1304. During impact, the lower surface of first segment 1311 comes in contact with anvil 1312, and a compression stress wave starts propagating along first segment 1311, towards the entrance of second segment 1308. In the transition from the first segment 1311 to the second segment 1308, this compression stress wave transforms to a combination of a compression stress wave and a positive-shear stress wave 1309, which propagate along the second segment 1308 towards the third segment 1306. In the transition from the second segment 1208 to the third segment 1206, the compression stress wave and the positive-shear stress wave 1309 transform to a compression stress wave and a negative-shear stress wave 1305, which propagate along the third segment 1306 towards the fourth segment 1303. In the transition from the third segment 1306 to the fourth segment 1303, the compression stress wave and the negative-shear stress wave 1305 transform to a compression stress wave and a positive-shear stress wave 1302, which propagate along the fourth segment 1303 all the way to the end.

The compression stresses in segments 1311, 1308, 1306 and 1303 have the same type—this is the reason why compression stress symbols are nor appearing on FIG. 13. The shear stresses change types in each adjacent segments 1311, 1308, 1306, and 1303. The stress is no-shear stress in first segment 1311, positive-shear stress 1309 in second segment 1308, negative-shear stress 1305 in third segment 1306, and positive-shear stress 1302 in fourth segment 1303.

Ruled Cleft-Mallets 1001 in FIG. 10, 1101 in FIG. 11, 1201 in FIG. 12, and 1301 in FIG. 13, have segments which are neither parallel, nor perpendicular, to the impact line. Those segments have shear stress, as well as linear stress, during impact. Depending on the orientation, the shear stress type, or the linear stress type, changes between two adjacent segments. If the adjacent segments are one above the other—then the shear stress changes type from positive-shear stress to negative-shear stress, or vice versa. If the adjacent segments are aside each other—then the linear stress type changes from compression stress to tension stress, or vice versa.

If one would, horizontally, squeeze Cleft-Mallets 1001 in FIG. 10 as to have segments 1011, 1012, 1010, 1006 being parallel each other, but keeping the clefts in between them all, then the result would be a Cleft-Mallet similar to Cleft-mallet 201 in FIG. 2—but with four linear segments instead of three linear segments in Cleft-Mallet 201.

Even though the centre of gravity of the Cleft-Mallet 1201 in FIG. 12 is coincident with the strike line 1213, during impact, Cleft-Mallet 1201 induces, apart from the vertical force, horizontal forces, and moments, on anvil 1212, due to the asymmetric structure.

Figures 14, 14A, 14B, 14C:
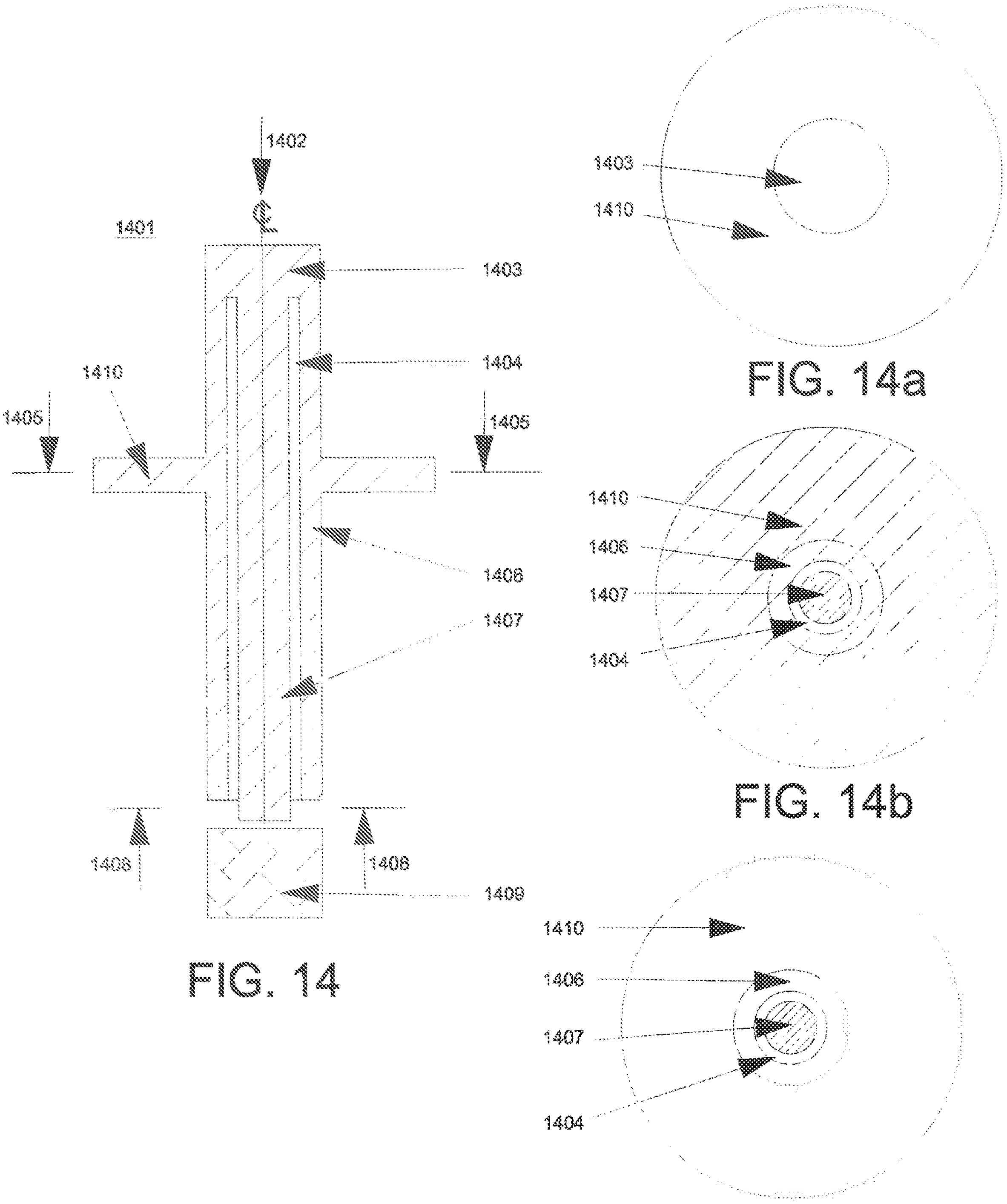
FIG. 14 shows a ruled Cleft-Mallet having a dynamic marker.
FIG. 14*a* is a top view of the Cleft-Mallet of FIG. 14.
FIG. 14*b* and FIG. 14*c* are cross sections through the Cleft-Mallet of FIG. 14.

Radial symmetric ruled Cleft-Mallet 1401 in FIG. 14 has two linear stress segments 1406, 1407, one deft 1404, one shear-stress segment 1403, and one extension 1410 connected to segment 1406. Cleft-Mallet 1401 strikes anvil 1409 along the centre line CL. During impact, extension 1410 creates, for a short while, intensive increase in the induced stress wave in anvil 1409. Instead of having extension in segment size, it is possible to have shrinkage, as to reduce the intensity of the induced stress in the anvil for a short while. This short-time increase or decrease in the stress wave intensity may be used as marker for the induced wave monitoring. There may be more than one marker in a Cleft-Mallet. The marker, or markers, may for instance but not exclusively be used in seismic, in acoustic, in piling, in defect finding, in vibration analyzing, and in structure analyzing.

FIG. 14*a* is top view 1402 of Cleft-Mallet 1401. FIG. 14*b* is cross section 1405 though Cleft-Mallet 1401. FIG. 14*c* is cross section 1408 though Cleft-Mallet 1401.

Figure 15:
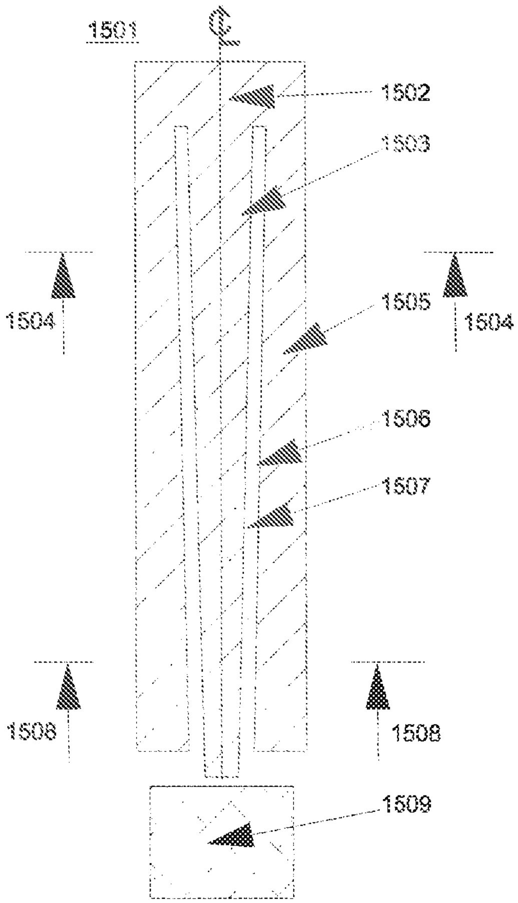
FIG. 15 shows a ruled Cleft-Mallet inducing increasing strength stress wave by time, during impact.
Figure 15B:
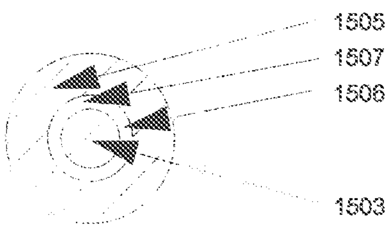
FIG. 15*a* and FIG. 15*b* are cross sections through the Cleft-Mallet of FIG. 15.
Figure 15A:
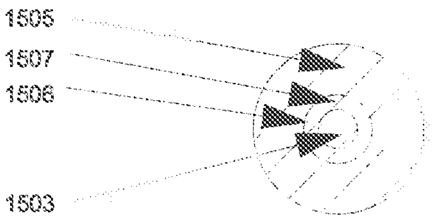

FIG. 15 shows a cross section through the centre line of a radial symmetric ruled Cleft-Mallet 1501, which strikes anvil 1509 along its centre line. Cleft-Mallet 1501 has two linear stress segments 1503, 1505, one shear stress segment 1502, and one deft 1506. The first linear stress segment 1503 has a conic shape as the lower part, which comes in contact with anvil 1509 during impact, is narrower than the upper part next to the second segment 1502. This structure induces, during impact, a stress wave which becomes stronger with time. Perpendicular to the centre line, the third linear stress segment 1505 has, next to the second segment 1502, a cross sectional area smaller than nearest to the anvil 1509. The cross sectional area of the third segment 1505 is gradually growing from the top, next to the second segment 1502, down to the end, direction anvil 1509. This structure induces, during impact, a stress wave which becomes stronger during time. This Cleft-Mallet 1501 is one, but not exclusive, example, showing how it is possible to shape the induced stress wave in the anvil. Changing the cross section of the effective area on the induced stress wave, and/or changing the material, are, but not exclusive, tools for shaping the induced stress wave in the anvil. FIG. 15*a* is a cross section 1508 through Cleft-Mallet 1501. FIG. 15*b* is a cross section 1504 trough Cleft-Mallet 1501.

So far, a description has been given of the structure of the Cleft-Mallet according to the present invention, but not about possible ways of manufacturing this structure. Many manufacturing methods are possible. For instance, it is possible to manufacture a Cleft-Mallet as a one-part object (monolith), for instance, cast or machined or forged. But it is also possible to manufacture a Cleft-Mallet by connecting two or more parts together. It is not important how various portions are attached to each other, as long as the connections are such that on the one hand they can withstand the forces occurring in practice and on the other hand they are capable of passing stress waves.

Figure 16:
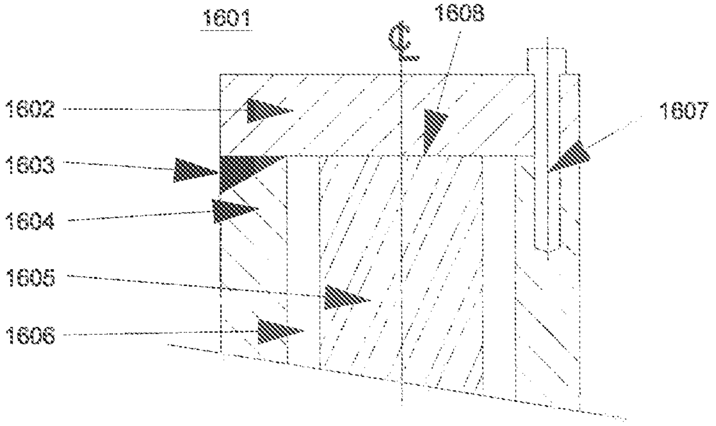
FIG. 16 shows few ways to connect segments.

FIG. 16 shows a cross section through a portion of a ruled Cleft-Mallet 1601 demonstrating three potential connecting ways. Part 1605 is connected to part 1602 by friction welding 1608. The left hand side of the figure shows that part 1602 can be connected to part 1604 by welding 1603, while the right hand side of the figure shows that part 1602 can be connected to part 1604 by bolting 1607, 1606 is a cleft.

Figure 17:
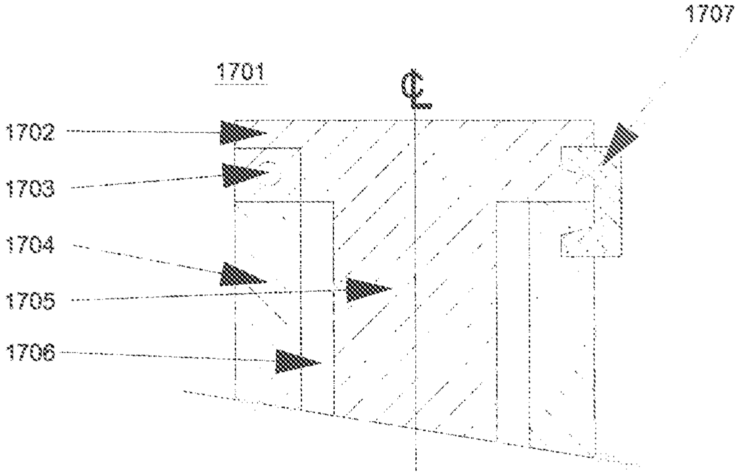
FIG. 17 shows few ways to connect segments.

FIG. 17 shows a similar cross section through a portion of a ruled Cleft-Mallet 1701 demonstrating two potential connecting ways. The left hand side of the figure shows that part 1702 can be connected to part 1704 by a pin 1703, while the right hand side of the figure shows that part 1702 can be connected to part 1704 by an external band 1707. The extension 1702 of part 1705 may be done, but not exclusive, by casting, by machining, by forging, and/or by any combination of them. 1706 is a cleft.

Figure 18:
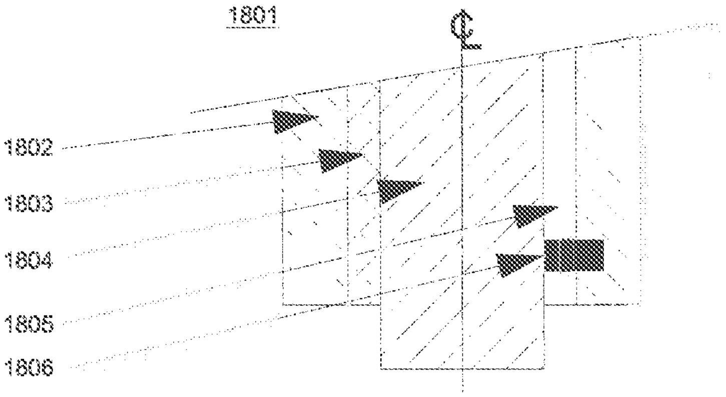
FIG. 18 shows few options for the clefts.

Any cleft may be kept empty, but may also be fully or partly filled with a flexible material, and/or may be supported by a sliding part. FIG. 18 shows a cross section through the lower part of a ruled Cleft-Mallet 1801. 1803 demonstrates flexible material filling up deft 1805, between segments 1802 and 1804. The flexible material has to allow relative, strain based, movement between segments 1802 and 1804. 1806 demonstrates a sliding part between segments 1802 and 1804.

Figure 19:
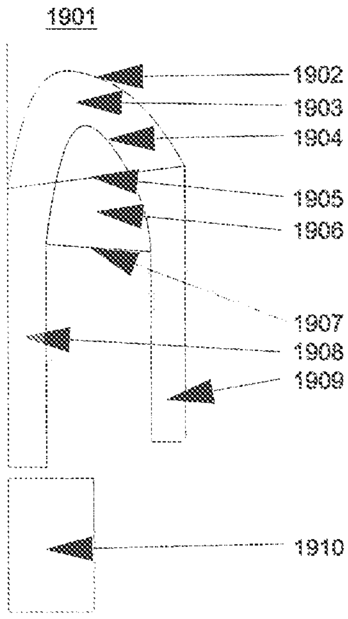
FIG. 19 shows a ruled Cleft-mallet with curved segment.

In case a Cleft-Mallet has one or more curved segments, an easy way to analyze it is by replacing the curved segment, or segments, with cubic shaped segment, or segments. FIG. 19 shows a planar ruled Cleft-Mallet 1901, which strikes anvil 1910. Segments 1908 and 1009 have a cubic shape while segment 1903 has a curved shape created by two curves 1902 and 1904. 1906 is a cleft. Lines 1905 and 1907 replace curves 1902 and 1904 for analyzing purpose.

Figure 20:
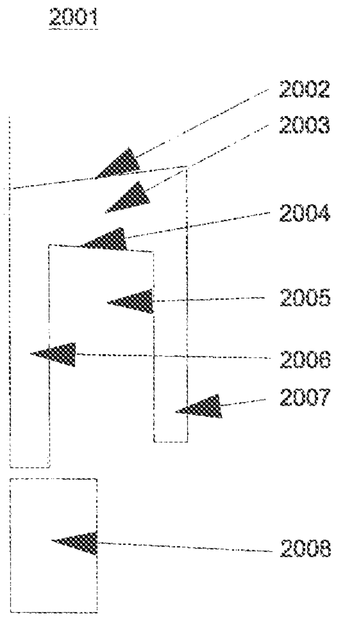
FIG. 20 shows an equivalent of the ruled Cleft-Mallet of FIG. 19, without curves.

FIG. 20 shows the result—the equivalent model for analysing ruled Cleft-Mallet 2001 strikes anvil 2008. Segments 2006 and 2007 replace FIG. 19 segments 1908 and 1909. Cleft 2005 replaces FIG. 19 cleft 1906. Segment 2003 replaces FIG. 19 segment 1903. Lines 2002, and 2004 replace FIG. 19 curves 1902, and 1904. Cleft-Mallet 2001 may easily be analyzed. If a Cleft-Mallet has more than one curved segment—for analyzing purposes, each of them has to be replaced by equivalent cubic, or conic, shaped segments.

Figure 21:
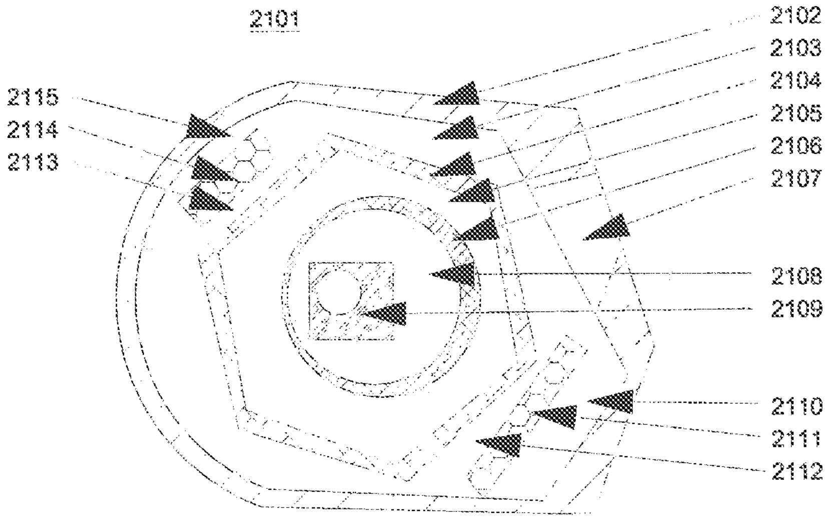
FIG. 21 shows a cross section of a ruled Cleft-Mallet having non-regular segments.

The segments of a one-into-the-other-segment kind of Cleft-Mallet do not have to be co-linear with each other, or having any certain relationship in between them. FIG. 21 shows a cross section, perpendicular to the strike vector, of a ruled Cleft-Mallet 2101. The segments are examples, but not exclusive, of potential shapes. The inner part 2109 is square, with eccentric through hole. Segment 2108 is round, but with variable wall thickness. Segment 2104 is hexagonal, but with variable wall thickness. Parts 2114 and 2111 are rectangular, together they function as one segment. Segment 2102 is a combination of different shapes. Segment 2102 has hole 2107. 2115, 2113, 2103, 2105, 2108, 2110, and 2112 are clefts. Clefts 2115, 2113, and 2103, as an example, are connecting, and overlapping, each other. Part 2111 contacts segment 2107.

There are situations in which it is beneficial to add to the linear stress in the anvil, side stresses, and/or moments, as well. Cleft-Mallet increases the time duration of the impulse, compared to a common mallet. The long time duration of the impulse enables manipulations of the induced stress wave.

Figure 22:
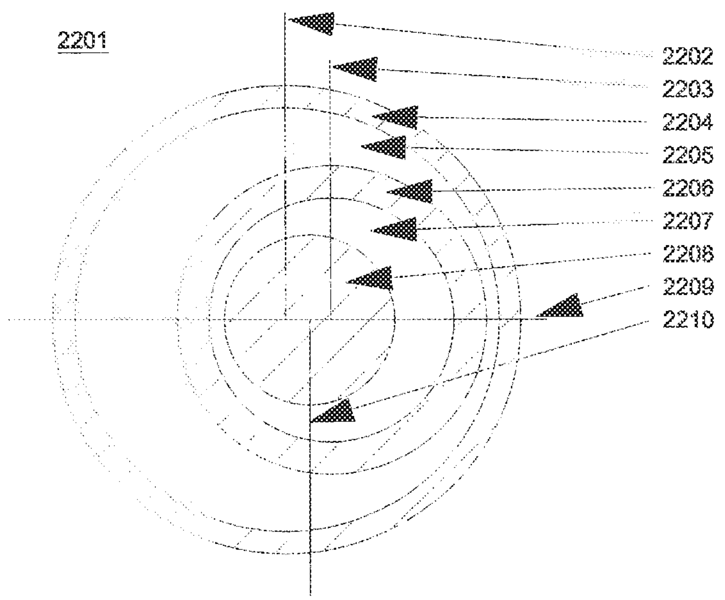
FIG. 22 shows a cross section through a ruled Cleft-Mallet having non-centered segments.

FIG. 22 shows, perpendicular to the strike line, a cross section of a ruled Cleft-Mallet 2201. The centre of gravity of Cleft-Mallet 2201 is the intersection between ones 2210 and 2209, but the centre of gravity of segment 2206 is the intersection of lines 2203 and 2209, and the centre of gravity of segment 2204 is the intersection between lines 2202 and 2209. During impact, the centre of the strike moves in between those centres of gravities. In other words, during the impact, the anvil is influenced, among other, by forces which are perpendicular to the strike one, and by moments, 2205, and 2207, are clefts.

Figure 23:
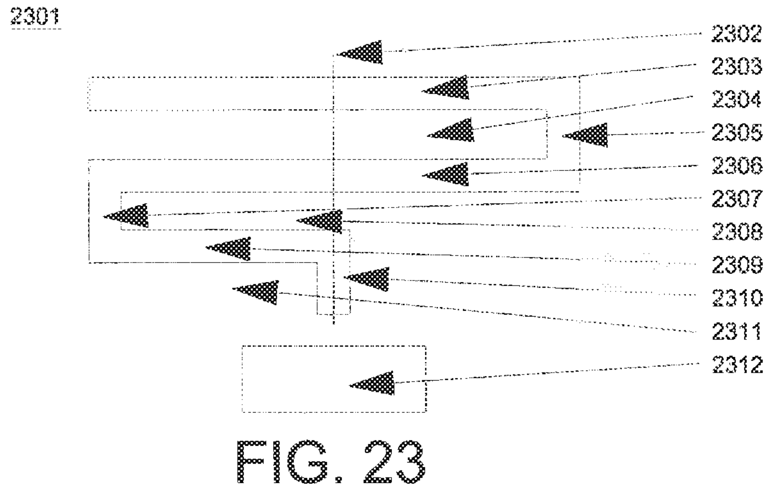
FIG. 23 shows a planar ruled Cleft-Mallet having non-symmetric structure.

FIG. 23 shows a view of a planar ruled Cleft-Mallet 2301, striking on anvil 2312. 2309, 2306, and 2303 are shear stress segments. 2310, 2307, and 2305 are linear stress segments. 2311, 2308, and 2304 are clefts. During impact, due to the asymmetric structure of the segments, the actual strike line moves to both sides of line 2302, causing forces which are perpendicular to line 2302, and moments.

Summarizing, in the above various examples have been described of ruled Cleft-Mallets having various different designs. These designs (and others) have in common that the total propagation path length for a stress wave generated on impact is longer than the mechanical length of the Cleft-Mallet. Herein, the mechanical length of a Cleft-Mallet is defined as the length measured in parallel to the strike line between extreme ends of the Mallet. The total propagation path length can be defined as the length a stress wave can travel before being forced to return along the same path.

A Rotary Cleft-Mallet is a Cleft-Mallet having angular velocity rather than the linear velocity of ruled Cleft-Mallet, in a typical configuration, the rotary Cleft-Mallet rotates around its radial center line, and has two or more contact faces which are coincident with the radial center line for striking the anvil. A rotary Cleft-Mallet induces, after striking, torsion stress wave in the anvil, causing rotary movement.

Rotary and ruled Cleft-Mallets are basically analogue to each other as far as design and operation are concerned. They both have cleft(s) and segments which follow the same declarations as at the beginning of this patent application. Both structures have longer mallet propagation path as compared to their strike line length. For the torsion stress wave propagating along the rotary Cleft-Mallet after impact with the anvil the same applies, mutatis mutandis, as for the linear stress wave propagating along the ruled Cleft-Mallet after impact with the anvil. The shear stress wave (with two opposite forces parallel to the strike vector) propagating along the rued Cleft-Mallet after impact with the anvil is analogue to the shear stress wave (with two opposite forces perpendicular to the angular movement center one) propagating along the rotary Cleft-Mallet after impact with the anvil.

It is therefore not necessary to repeat the detailed explanation above for the rotary embodiment.

Below, a table is given with respect to the correspondence between the parameters of ruled and rotary Cleft-Mallets:

| Ruled Cleft-Mallet | Rotary Cleft Mattel |
|---|---|
| Cleft | Cleft |
| Segment | Segment |
| Anvil | Anvil |
| Contact face | Contact feces |
| Strike vector (line) | Angular movement center line |
| Compression stress | Positive torsion stress |
| Tension stress | Negative torsion stress |
| Linear stress | Torsion stress |
| No linear stress | No torsion stress |
| Positive shear stress | Positive shear stress |
| Negative shear stress | Negative shear stress |
| Shear stress | Shear stress |
| No shear stress | No shear stress |

The above explanations, descriptions, and restrictions are valid for rotary Cleft-Mallets if the 'ruled' parameters mentioned above are converted to the corresponding 'rotary' parameters and the necessary consequent adjustments are done as well.

It is noted that the angular analogy to mass is moment of inertia. Moment of inertia is proportional to the mass times the distance squared of the mass from the center line of rotation. In other words, for rotating bodies it is important to know both the mass and the distance from the rotary center line, which is not important for ruled motion body. This effect has no influence on the behaviour of a rotary Cleft-Mallet, as it regards to this innovation.

It is further noted that rotary movement of a body involves centripetal force, and this applies to rotary Cleft-Mallets as well. The centripetal force has no influence on the behaviour of rotary Cleft-Mallet as it regards to this innovation.

The number, shape, and arrangement of the contact face(s) of rotary Cleft-Mallet can be varied as desired.

FIG. 28 shows a cross section perpendicular to the rotary center line 2803 of a rotary Cleft-Mallet 2801 and an anvil 2802. FIG. 28*a* and FIG. 28*b* show cross sections 2813 and 2812, respectably, collinear with the rotary center line 2803 of rotary Clef-Mallet 2801 and anvil 2802. Cleft-Mallet 2801 has three torsion stress segments: positive torsion segment 2807, negative torsion segment 2809, positive torsion segment 2816; two shear segments: positive shear segment 2806, positive shear segment 2818; two clefts 2808, 2817; two bosses 2811; and two contact faces 2815. Anvil 2802 has a shaft 2804, two bosses 2810, and two contact faces 2814. 2805 is the tolerance between Cleft-Mallet 2801 and anvil 2802.

The bosses 2811 of Cleft-Mallet 2801, and the bosses 2810 of anvil 2802, are constructed in such a way that there is certain amount of free relative rotary movement, around rotary center line 2803, in between them both, before contact faces 2814 of anvil 2802 come in contact with contact surfaces 2815 of Cleft-Mallet 2801. If Cleft-Mallet 2801 rotates anti-clock wise around center line 2803, eventually contact faces 2815 will strike contact faces 2814.

After a strike of contact faces 2815 on contact faces 2814, a positive-torsion stress wave travels along torsion stress segment 2807, towards shear stress segment 2808. This torsion stress wave is converted in shear stress segment 2806 to a positive-shear stress wave, which propagates outwards towards torsion stress segment 2809. This shear stress wave is converted to a negative-torsion stress wave while moving from shear stress segment 2806 to torsion stress segment 2809, then it travels as negative-torsion stress wave along torsion stress segment 2809 all the way to shear segment 2818. While moving from torsion segment 2809 to shear segment 2818, the negative-torsion stress wave changes to positive shear stress which propagates along shear stress segment 2818 outward direction torsion segment 2816. While moving from shear segment 2818 to torsion segment 2616, the positive-shear stress wave is converted to a positive-torsion stress wave, which propagates along torsion stress segment 2816, all the way to the free end.

Clefts 2808, 2817 separate torsion segments 2807, 2809, 2816 and do not allow the torsion stress wave to cut short in between them, but to propagate through shear stress segments 2806, 2818. The gap 2805 allows free rotary movement, around center line 2803, between Cleft-Mallet 2801 and anvil 2802 within the rotary free zones dictates by bosses 2810 and 2811.

The stress wave traveling length through rotary Cleft-Mallet 2801, after rotary striking of anvil 2802, is, about, three times longer than the length of a cleft-free mallet having the same external dimensions.

Figure 29A:
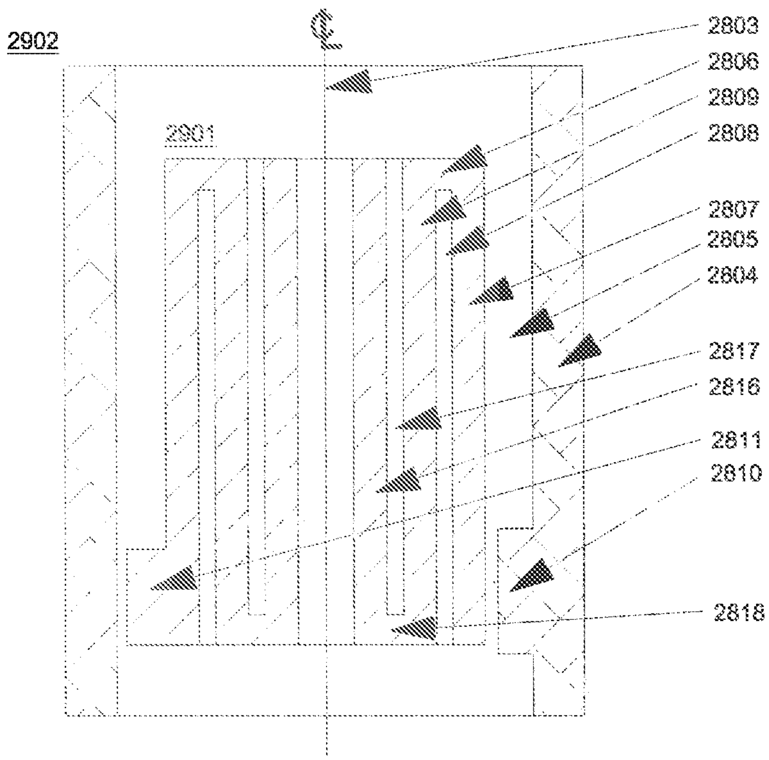
FIG. 29*a* is a cross section through the rotary Cleft-Mallet of FIG. 29.
Figure 29:
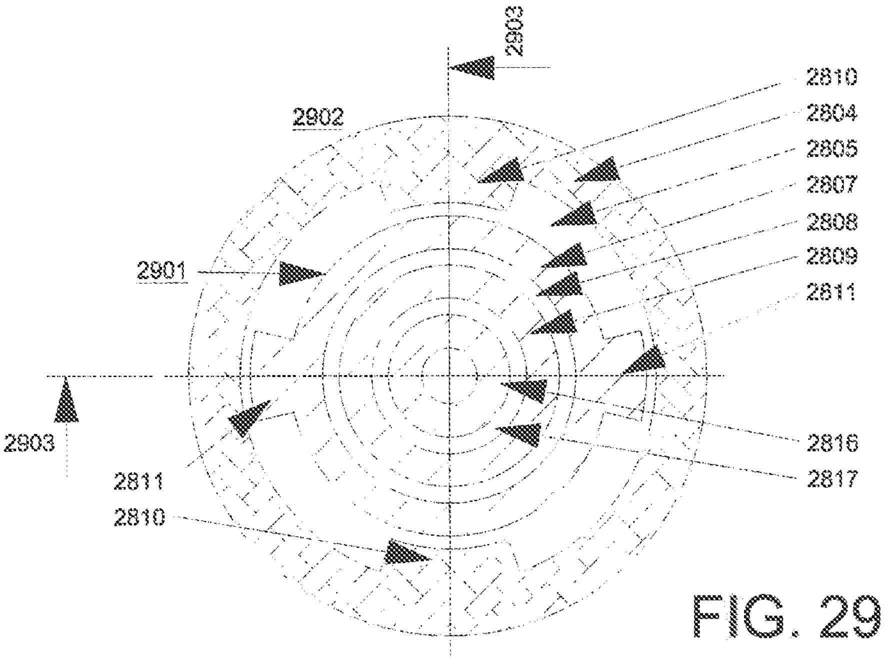
FIG. 29 shows a rotary Cleft-Mallet having two clefts and three segments. The rotary Cleft-Mallet is within the anvil.

FIG. 29 and 29*a* are comparable to FIG. 28, 28*a*, and 28*b*, showing a rotary Cleft-Mallet inside the anvil. It has to be noted that the direction of the stress flow in shear stress segments 2806 and 2818 is inward, direction the center of rotation 2803.

Figure 30:
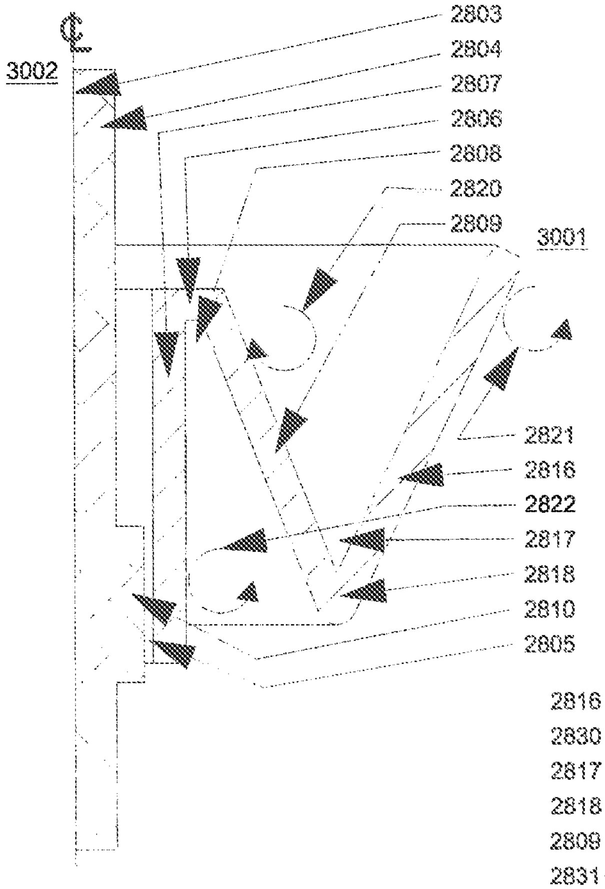
FIG. 30 shows a rotary Cleft-Mallet having two clefts, one cylinder-shaped segment and two conic-shaped segments located at the side of the cylindrical segment. The lower part of the inner segment strikes the anvil.

FIG. 30 is a cross-section of an embodiment of a rotary Cleft-Mallet in which: segment 2807 has positive torsion stress and zero shear stress;

Segment 2806 has positive-shear stress and zero torsion stress; segment 2809 has negative-torsion stress and positive shear stress;

Segment 2818 has positive-shear stress and zero torsion stress; segment 2816 has positive-torsion stress and positive-shear stress.

Figure 31:
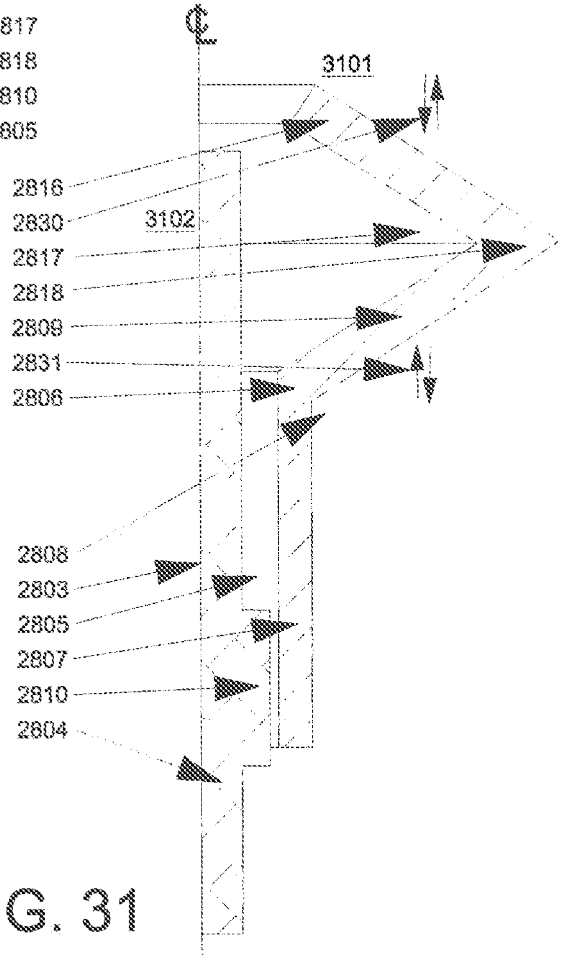
FIG. 31 shows a rotary Cleft-mallet having two clefts, one cylinder-shaped segment and two conic-shaped segments located above the cylindrical segment. The lower part of the inner segment strikes the anvil.

FIG. 31 is a cross-section of an embodiment of a rotary Cleft-Mallet in which: segment 2807 has positive torsion stress and zero shear stress;

Segment 1206 has positive-shear stress and zero torsion stress; segment 2809 has positive torsion stress and positive shear stress;

Segment 2818 has positive-torsion stress and zero shear stress; segment 2816 has positive torsion stress and negative shear stress.

Figure 32:
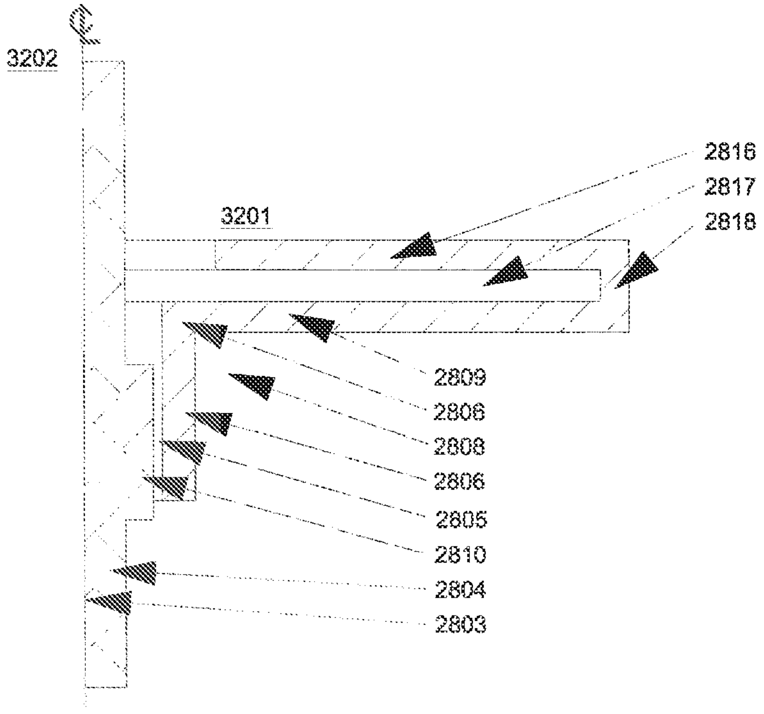
FIG. 32 shows a rotary Cleft-Mallet having two clefts, two cylinder-shaped segments, and two disk-shaped segments. The lower part of the inner cylindrical segment strikes the anvil.

FIG. 32 is a cross section of an embodiment of a rotary Cleft-Mallet in which:

Segment 2806 has positive-torsion stress;

Segment 2809 has positive-shear stress;

Segment 2818 has positive-torsion stress;

Segment 2816 has negative-shear stress;

Most of the stress wave traveling time is as shear stress along segments 2809 and 2816.

Figure 27:
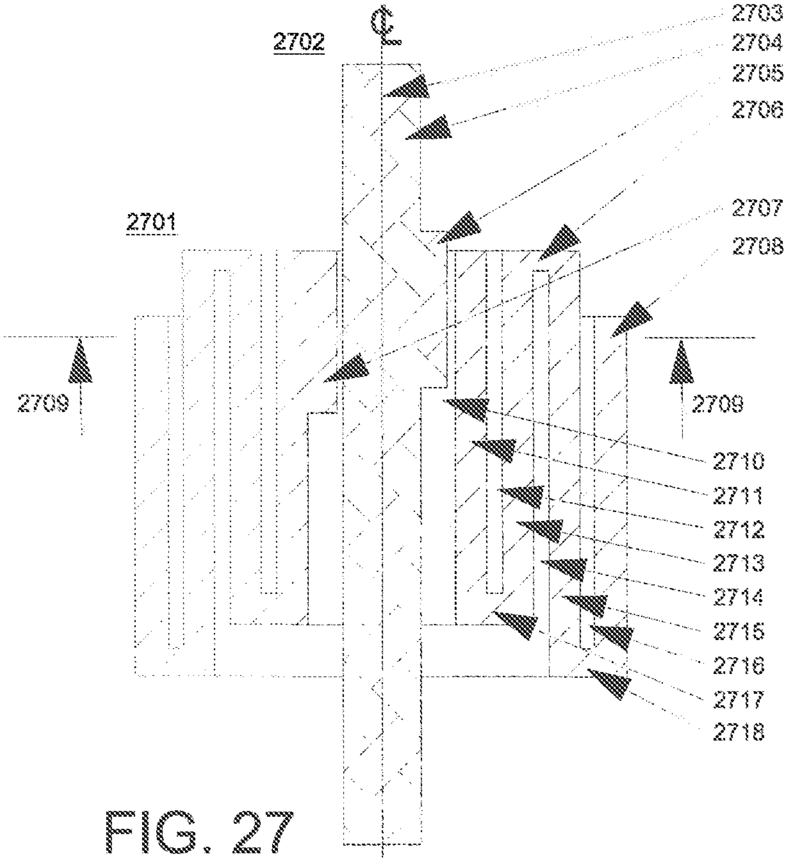
FIG. 27 shows a rotary Cleft-Mallet having three clefts and four segments. The segments have different lengths. The upper part of the inner segment strikes the anvil.
Figure 27A:
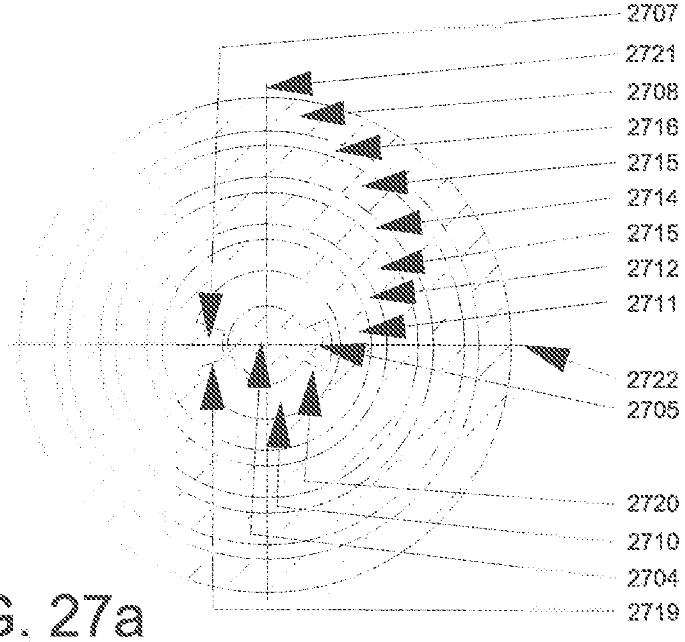
FIG. 27*a* is a cross section through the rotary Cleft-Mallet of FIG. 27.

The rotary Cleft-Mallet illustrated in FIG. 27 and 27*a* is the same as in FIG. 28 and 28*a*, except that it has one more torsion stress segment, the torsion segments have different lengths, and the contact faces are at the top.

It should be clear to a person skilled in the art that the present invention is not limited to the exemplary embodiments discussed above, but that several variations and modifications are possible within the protective scope of the invention as defined in the appending claims. For instance, some of the exemplary embodiments have been described as being rotational symmetric, but such symmetry is not essential for the functioning of the Cleft-Mallet in accordance with the present invention. For instance, a Cleft-Mallet may have a square profile, or a hexagonal profile, or an octagonal profile, or an even higher-order profile. Further, it is not essential that tube-shaped segments are contiguous in circumferential direction: the principles of the present invention can also be applied in an embodiment where a segment is actually consisting of a plurality of mutually parallel parts.

Further, while in the embodiments of FIGS. 1, 2, 3, 4, 5 the innermost segment is shown as being a solid bar, this is not essential: this innermost segment may be implemented as a hollow bar or tube.

Figure 26:
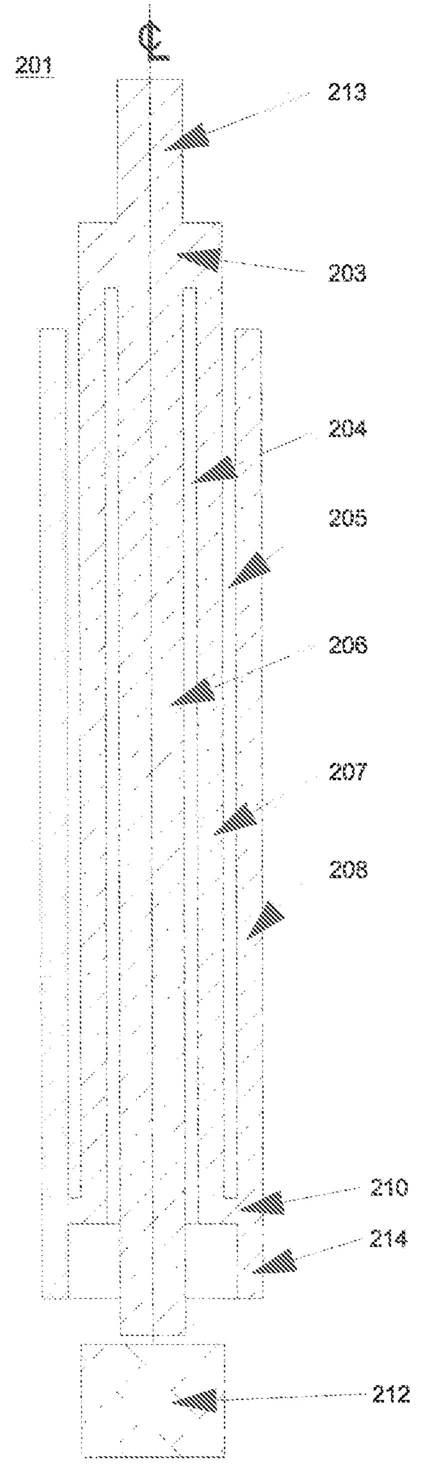
FIG. 26 shows a ruled Cleft-Mallet having two clefts and three segments. The entrance of the outer segment is not at the lowest point of it. The exit of the inner segment is not at the highest point of it.

Furthermore, FIG. 26 shows a modification of FIG. 2. Second segment 203 is connected to first segment 206 a portion before the top end of first segment 206. Forth segment 210 is connected to fifth segment 208 a portion before the lower end of fifth segment 208. The embodiment of FIG. 26 shows more options regarding the connections between adjust segments—they may be done any point along the segments. Portions 213, 214 are outside the main stress wave propagation.

Further, the dimensioning of the various segments and clefts is not essential for the functioning of the Cleft-Mallet in accordance with the present invention. For instance, in the cross sections of FIGS. 2 and 2*b*, the tubular segments are shown as having mutually the same wall thickness, but this is only for sake of illustration and is not to be interpreted as limiting feature. A similar remark applies to the clefts.

Even if certain features are recited in different dependent claims, the present invention also relates to an embodiment comprising these features in common. Even if certain features have been described in combination with each other, the present invention also relates to an embodiment in which one or more of these features are omitted. Features which have not been explicitly described as being essential may also be omitted. Any reference signs in a claim should not be construed as limiting the scope of that claim.

The invention claimed is:

1. A cleft-mallet comprising:

a first segment comprising an inner element having a contact face defining a terminal proximal end of the cleft-mallet;

a second segment comprising a radial element having a terminal face defining a terminal distal end of the cleft-mallet and an opposing proximal face;

a third segment comprising an outer tube directly connected to the radial element at a first connection portion, the first connection portion having a terminal face coincident with the terminal distal end of the cleft-mallet; and a cleft;

wherein:

the outer tube has a first longitudinal axis and a first length from a distal end to an opposite proximal end measured along the first longitudinal axis;

the inner element is directly connected to the radial element at a second connection portion, the second connection portion having a terminal face coincident with the terminal distal end of the cleft-mallet;

the cleft-mallet longitudinally extends exclusively between the contact face of the inner element and the coincident terminal faces of the radial element, the first connection portion, and the second connection portion;

the inner element is arranged within the outer tube and has a second longitudinal axis and a second length from a distal end to an opposite proximal end measured along the second longitudinal axis, wherein the proximal end has a free end surface defining the contact face for impacting and driving an anvil configured as a hollow or solid pile into the earth;

the second longitudinal axis is parallel to the first longitudinal axis;

other than the respective connection portions, each of the inner element, the outer tube, and the radial element are separated one from another by the cleft;

at least a part of the outer tube is a longitudinal segment configured for a stress wave traveling from the distal end of the outer tube to the proximal end of the outer tube;

at least a part of the inner element is a longitudinal segment configured for a stress wave generated on impact of the contact face and the anvil traveling from the proximal end of the inner element to the distal end of the inner element;

the radial element is a radial segment configured for a shear stress wave traveling from the distal end of the inner element to the distal end of the outer tube; and in use, the stress wave generated on impact of the contact face can only make a transition from the inner element to the radial element via the second connection portion and can only make a transition from the radial element to the outer tube via the first connection portion.

2. The cleft-mallet according to claim 1, configured so that the stress wave changes direction and stress type at the transition from the first segment to the second segment, and at the transition from the second segment to the third segment.

3. The cleft-mallet according to claim 2, wherein:

in the first segment, the stress wave is a linear stress wave;

in the second segment, the stress wave is a shear stress wave; and in the third segment, the stress wave is a linear stress wave.

4. The cleft-mallet according to claim 2, wherein:

in the first segment, the stress wave is a shear stress wave;

in the second segment, the stress wave is a linear stress wave; and in the third segment, the stress wave is a shear stress wave.

5. The cleft-mallet according to claim 2, wherein:

in at least one segment of the first, second and third segments, the stress wave comprises at least a positive-shear stress wave; and in at least one different segment of the first, second and third segments, the stress wave comprises at least a negative-shear stress wave.

6. The cleft-mallet according to claim 2, wherein:

in at least one segment of the first, second and third segments, the stress wave comprises at least a compression stress wave; and in at least one different segment of the first, second and third segments, the stress wave comprises at least a tension stress wave.

7. The cleft-mallet according to claim 2, wherein:

in the first segment, the stress wave is a torsion stress wave;

in the second segment, the stress wave is a shear stress wave; and in the third segment, the stress wave is a torsion stress wave.

8. The cleft-mallet according to claim 2, wherein:

in the first segment, the stress wave is a shear stress wave;

in the second segment, the stress wave is a torsion stress wave; and in the third segment, the stress wave is a shear stress wave.

9. The cleft-mallet according to claim 2, wherein:

in at least one segment of the first, second and third segments, the stress wave comprises at least a positive-torsion stress wave; and in at least one different segment of the first, second and third segments, the stress wave comprises at least a negative-torsion stress wave.

10. The cleft-mallet according to claim 1, wherein:

the inner element is selected from the group consisting of a tube and a rod;

the distal end of the inner element is coincident with one of the proximal face or the terminal face of the radial element;

the distal end of the outer tube is coincident with one of the proximal face or the terminal face of the radial element; and the second longitudinal axis is coinciding with the first longitudinal axis.

11. The cleft-mallet according to claim 1 further comprising:

two or more second outer tubes; and two or more second clefts;

wherein a first cleft of the second clefts separates the outer tube from a first outer tube of the second outer tubes arranged around the outer tube;

wherein a second cleft of the second clefts separates the first outer tube of the second outer tubes from a second outer tube of the second outer tubes arranged around the first outer tube of the second outer tubes;

wherein each of the second outer tubes are arranged around each other from an outermost second outer tube to an innermost second outer tube; and wherein ends of respective second outer tubes are always connected to ends of neighboring second outer tubes in alternating, or zig-zag, manner.

12. The cleft-mallet according to claim 11, wherein a free end of the outermost second outer tube has at least one boss connected to an outer side;

wherein an axial end surface of the boss defines a second contact face; and wherein the boss is configured to function as a shear stress segment for shear stress waves.

13. The cleft-mallet according to claim 11, wherein the inner element is a tube;

wherein the free end surface of the tube has at least one boss or cover connected to an inner side;

wherein an axial end surface of each boss or cover defines the contact face; and wherein each boss or cover is configured to function as a shear stress segment for shear stress waves.

14. The cleft-mallet according to claim 11, wherein the inner element is a tube;

wherein the distal end of the tube is open and coincident with the terminal face of the radial element; and wherein the distal end of the tube defines a second contact face.

15. An assembly comprising:

the cleft-mallet according to claim 14; and an anvil passing through the tube.

16. The cleft-mallet according to claim 1, having a mechanical length measured in parallel to an impact line, wherein the segments together define at least one stress wave propagation path that is longer than the mechanical length.

17. The cleft-mallet according to claim 1 further comprising:

a fourth segment comprising a second radial element directly connected to the outer tube at a third connection portion;

a fifth segment comprising a second tube directly connected to the second radial element at a fourth connection portion, the second tube arranged around the third segment; and a second cleft;

wherein:

the second tube has a third longitudinal axis and a third length from a distal end to an opposite proximal end measured along the third longitudinal axis;

the third connection portion is proximal to the proximal end of the outer tube the fourth connection portion is proximal to the proximal end of the second tube;

the second cleft separates the second tube, the outer tube, and the second radial element from each other; and while the first length and the third length are substantially the same length, the first length is different than the third length.

18. A cleft-mallet comprising:

a first segment comprising an inner element having an inner element distal end and an opposite inner element proximal end;

a second segment comprising a radial element having a terminal face defining a terminal distal end of the cleft-mallet and an opposing proximal face;

a third segment comprising an outer tube directly connected to the radial element at a first connection portion, the first connection portion having a terminal face coincident with the terminal distal end of the cleft-mallet, the outer tube further having a contact face defining a terminal proximal end of the cleft-mallet; and a cleft;

wherein:

the outer tube has a first longitudinal axis and a first length from the proximal end to an opposite distal end measured along the first longitudinal axis;

the inner element is directly connected to the radial element at a second connection portion, the second connection portion having a terminal face coincident with the terminal distal end of the cleft-mallet;

the cleft-mallet longitudinally extends exclusively between the contact face of the outer tube and the coincident terminal faces of the radial element, the first connection portion, and the second connection portion;

the inner element is arranged within the outer tube and has a second longitudinal axis and a second length from the inner element distal end to the opposite inner element proximal end measured along the second longitudinal axis;

the proximal end of the outer tube has a free end surface defining the contact face for impacting and driving an anvil configured as a hollow or solid pile into the earth;

the second longitudinal axis is parallel to the first longitudinal axis;

other than the respective connection portions, each of the inner element, the outer tube, and the radial element are separated one from another by the cleft;

at least a part of the inner element is a longitudinal segment configured for a stress wave traveling from the distal end of the inner element to the proximal end of the inner element;

at least a part of the outer tube is a longitudinal segment configured for a stress wave generated on impact of the contact face and the anvil traveling from the proximal end of the outer tube to the distal end of the outer tube;

the radial element is a radial segment configured for a shear stress wave traveling from the distal end of the outer tube to the distal end of the inner element; and in use, the stress wave generated on impact of the contact face can only make a transition from the outer tube to the radial element via the first connection portion and can only make a transition from the radial element to the inner element via the second connection portion.

19. The cleft-mallet according to claim 18, wherein:

the inner element is selected from the group consisting of a tube and a rod;

the distal end of the inner element is coincident with one of the proximal face or the terminal face of the radial element;

the distal end of the outer tube is coincident with one of the proximal face or the terminal face of the radial element; and the second longitudinal axis is coinciding with the first longitudinal axis.

20. The cleft-mallet according to claim 18, wherein:

the inner element is an inner tube;

the cleft-mallet further comprises:

two or more second inner tubes; and two or more second clefts;

a first cleft of the second clefts separates the inner tube from a first inner tube of the second inner tubes arranged within the inner tube;

a second cleft of the second clefts separates the first inner tube of the second outer tubes from a second inner tube of the second inner tubes arranged within the first inner tube of the second inner tubes;

each of the second inner tubes are arranged around each other from an innermost second inner tube to an outermost second inner tube; and ends of respective second inner tubes are always connected to ends of neighboring second inner tubes in alternating, or zig-zag, manner.

* * * * *